United States Patent
Browne et al.

(10) Patent No.: US 11,028,242 B2
(45) Date of Patent: Jun. 8, 2021

(54) MODIFIED SILICON PARTICLES FOR SILICON-CARBON COMPOSITE ELECTRODES

(71) Applicant: Enevate Corporation, Irvine, CA (US)

(72) Inventors: Ian Russell Browne, Orange, CA (US); Liwen Ji, San Diego, CA (US); Rahul R. Kamath, Mission Viejo, CA (US); Monika Chhorng, Irvine, CA (US)

(73) Assignee: ENEVATE CORPORATION, Irvine, CA (US)

(*) Notice: Subject to any disclaimer, the term of this patent is extended or adjusted under 35 U.S.C. 154(b) by 91 days.

(21) Appl. No.: 16/430,290

(22) Filed: Jun. 3, 2019

(65) Prior Publication Data

US 2020/0377678 A1    Dec. 3, 2020

(51) Int. Cl.
| | |
|---|---|
| H01M 4/36 | (2006.01) |
| H01M 4/13 | (2010.01) |
| H01M 4/04 | (2006.01) |
| H01M 4/38 | (2006.01) |
| H01M 4/583 | (2010.01) |
| H01M 4/02 | (2006.01) |
| C08J 5/18 | (2006.01) |
| C08K 5/32 | (2006.01) |
| C08K 9/06 | (2006.01) |
| C08K 3/02 | (2006.01) |
| H01M 10/052 | (2010.01) |
| C08K 5/5419 | (2006.01) |

(52) U.S. Cl.
CPC .......... *C08J 5/18* (2013.01); *C08K 3/02* (2013.01); *C08K 5/32* (2013.01); *C08K 5/5419* (2013.01); *C08K 9/06* (2013.01); *H01M 4/0471* (2013.01); *H01M 4/13* (2013.01); *H01M 4/364* (2013.01); *H01M 4/386* (2013.01); *H01M 4/583* (2013.01); *H01M 10/052* (2013.01); *C08J 2361/04* (2013.01); *C08J 2379/08* (2013.01); *C08K 2003/023* (2013.01); *H01M 2004/027* (2013.01)

(58) Field of Classification Search
None
See application file for complete search history.

(56) References Cited

U.S. PATENT DOCUMENTS 9,553,303 B2   1/2017  Park et al.
10,461,366 B1* 10/2019 Anderson ............. H01M 4/386
(Continued)

FOREIGN PATENT DOCUMENTS

| JP | 2011011928 A | * | 1/2011 | |
| WO | 2012/133143 A1 | | 10/2012 | |
| WO | WO-2013141481 A1 | * | 9/2013 | ........ H01M 10/0436 |

OTHER PUBLICATIONS

JP-2011011928-A English machine translation (Year: 2011).*

(Continued)

*Primary Examiner* — Jacob B Marks
(74) *Attorney, Agent, or Firm* — McAndrews, Held & Malloy, Ltd.

(57) ABSTRACT

Methods of forming a composite material film can include providing a mixture comprising a precursor and silane-treated silicon particles. The methods can also include pyrolysing the mixture to convert the precursor into one or more carbon phases to form the composite material film with the silicon particles distributed throughout the composite material film.

58 Claims, 32 Drawing Sheets

(56) References Cited

U.S. PATENT DOCUMENTS

| | | | | |
|---|---|---|---|---|
| 2007/0298267 | A1* | 12/2007 | Zhong | H01M 8/0206 |
| | | | | 428/447 |
| 2014/0130969 | A1* | 5/2014 | McCutcheon | B32B 38/10 |
| | | | | 156/247 |
| 2014/0377543 | A1* | 12/2014 | Lodde | C09J 133/06 |
| | | | | 428/331 |
| 2016/0111696 | A1 | 4/2016 | Shang et al. | |
| 2016/0175767 | A1* | 6/2016 | Richter | B01D 71/025 |
| | | | | 95/52 |
| 2016/0254537 | A1* | 9/2016 | Kamo | H01M 4/583 |
| | | | | 429/231.8 |
| 2019/0097222 | A1* | 3/2019 | Feaver | H01M 4/366 |
| 2019/0181426 | A1* | 6/2019 | Park | H01M 4/625 |
| 2019/0355980 | A1* | 11/2019 | Holt | H01M 4/628 |
| 2020/0020935 | A1* | 1/2020 | Costantino | H01G 11/06 |

OTHER PUBLICATIONS

WO-2013141481-A1 English machine translation (Year: 2013).*
Notification of Transmittal of the International Search Report and the Written Opinion of the International Searching Authority, dated Nov. 10, 2020, 11 pages.

* cited by examiner

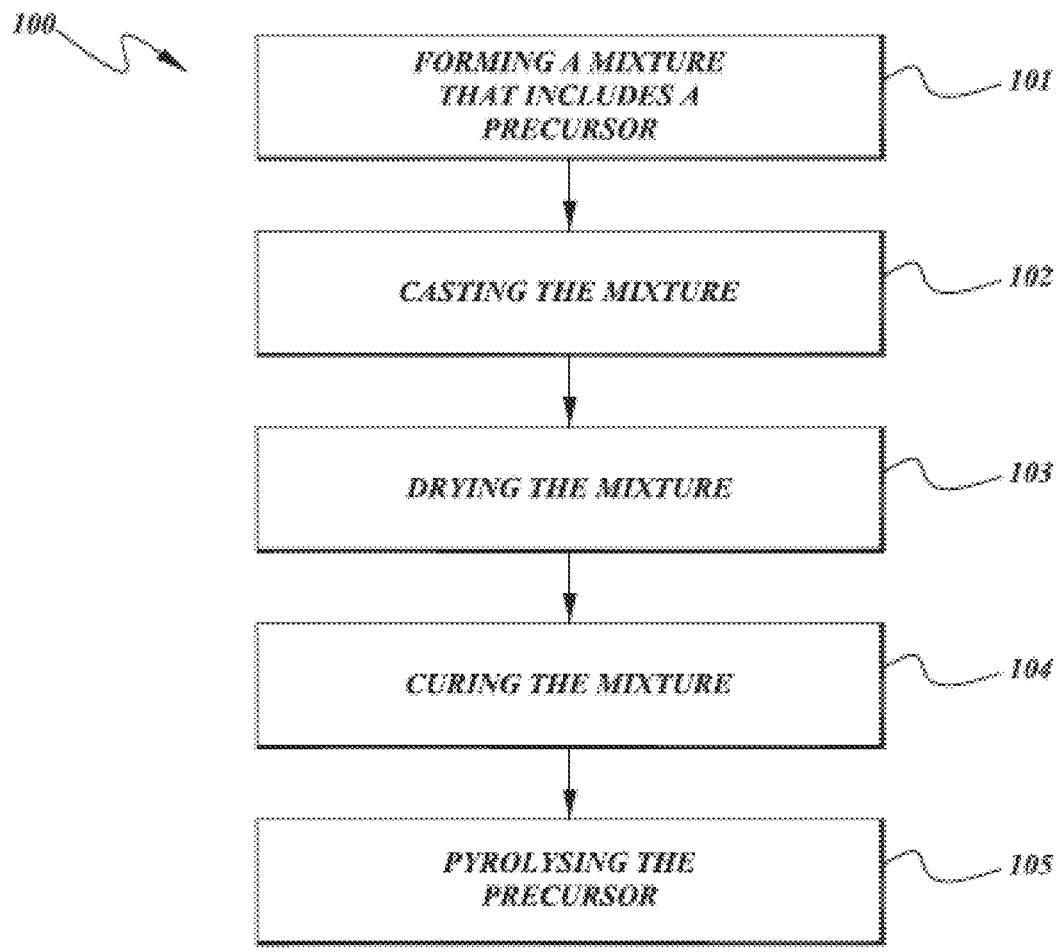
FIG. IA

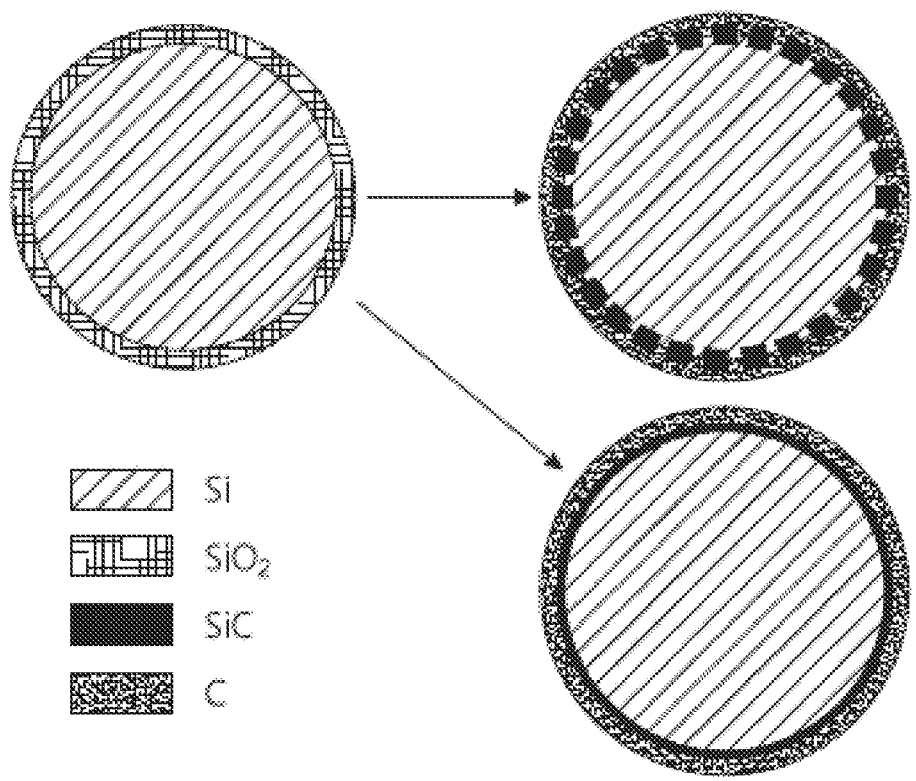
FIG. IB

| Major | Si |
|---|---|
| Elements looked for but not detected (<0.001) | Ag |
| | Al |
| | B |
| | Be |
| | Bi |
| | Cd |
| | Co |
| | Cr |
| | Cu |
| | Fe |
| | Ge |
| | In |
| | Mg |
| | Mn |
| | Mo |
| | Nb |
| | Ni |
| | Pb |
| | Sb |
| | Sn |
| | Sr |
| | Ti |
| | V |
| | W |
| | Zn |
| | Zr |
| Elements looked for but not detected (<0.005) | As |
| | Ca |

FIG. 26

MODIFIED SILICON PARTICLES FOR SILICON-CARBON COMPOSITE ELECTRODES

BACKGROUND

Field

The present application relates generally to silicon particles. In particular, the present application relates to silicon particles and composite materials including silicon particles for use in battery electrodes.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

SUMMARY

In certain implementations, a method of forming a composite material film is disclosed. The method can include providing a mixture comprising a precursor and silane-treated silicon particles. The method can also include pyrolysing the mixture to convert the precursor into one or more carbon phases to form the composite material film with the silicon particles distributed throughout the composite material film.

In various implementations, the silane-treated silicon particles can comprise silicon particles treated with one or more organosilanes. For example, the silane-treated silicon particles can comprise silicon oxide surfaces reacted with the one or more organosilanes. In some instances, one or more organosilanes can comprise one or more silanols, silyl ethers, silyl chlorides, dialkylaminosilanes, silyl hydrides, or cyclic azasilanes.

In some methods, one or more organosilanes can comprise one or more aminoalkyl functional groups. For example, one or more organosilanes can comprise 3-aminopropyltriethoxysilane, N-(2-aminoethyl)-3-aminopropyltrimethoxysilane, or 2,2-dimethoxy-1,6-diaza-2-silacyclooctane. In some instances, the precursor can comprise polyimide.

In some methods, one or more organosilanes can comprise an epoxide linker. For example, the epoxide linker can comprise 5,6-epoxyhexyltriethoxysilane. In some instances, the precursor can comprise a phenolic resin.

In some methods, one or more organosilanes can comprise an aromatic functional group. For example, one or more organosilanes can comprise benzyltriethoxysilane. In some instances, the precursor can comprise polycyclic aromatic hydrocarbon.

In some methods, one or more organosilanes can comprise dodecylsilane.

In some methods, one or more organosilanes can comprise (N,N-dimethylamino)trimethylsilane.

In some methods, the silicon particles can be suspended in liquid comprising the one or more organosilanes.

In some methods, the silicon particles can be exposed to one or more organosilane vapors.

In some methods, the mixture can comprise one or more organosilanes.

In some implementations, the composite material film can comprise the silicon particles at about 50% to about 99% by weight. The composite material film can be electrochemically active. One or more types of carbon phases can be a continuous phase that holds the composite material film.

In various implementations, a method of forming a battery electrode is disclosed. The electrode can include the composite material film described herein. In some instances, the electrode can be an anode.

BRIEF DESCRIPTION OF THE DRAWINGS

FIG. 1A illustrates an embodiment of a method of forming a composite material that includes forming a mixture that includes a precursor, casting the mixture, drying the mixture, curing the mixture, and pyrolyzing the precursor;

FIG. 1B is a schematic illustration of the formation of silicon carbide on a silicon particle;

FIG. 26 is a chemical analysis of the sample silicon particles;

DETAILED DESCRIPTION

Figure 2A:
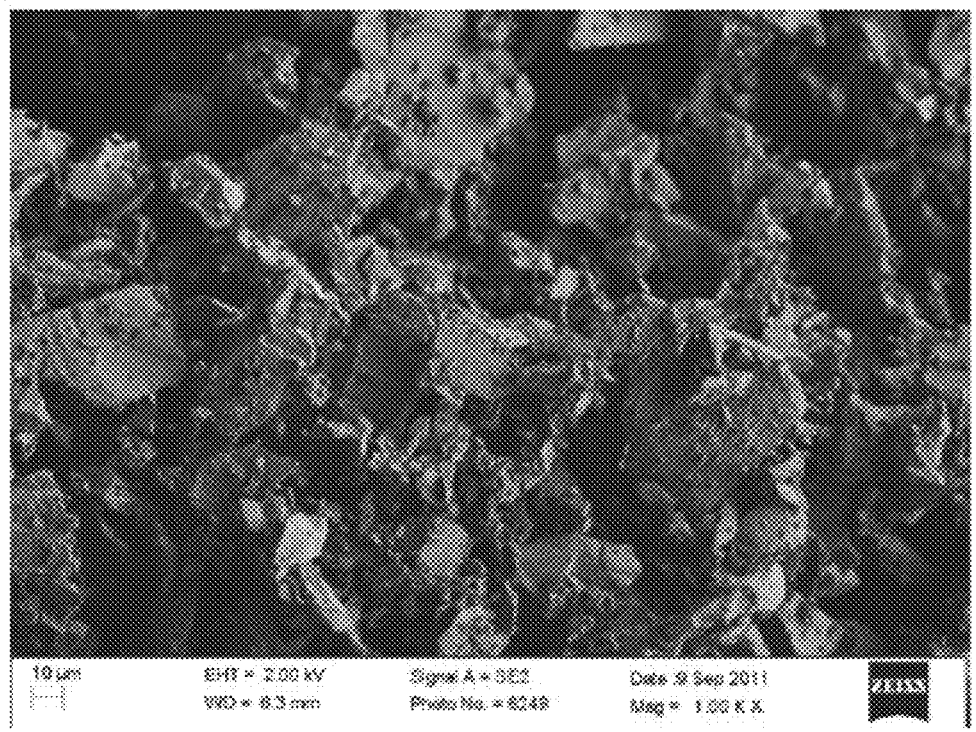
FIGS. 2A and 2B are SEM micrographs of one embodiment of micron-sized silicon particles milled-down from larger silicon particles.

Silicon-carbon composite electrodes can include silicon particles suspended in a carbon matrix. The electrodes can include the composite material as a self-supported structure or attached to a current collector. Silicon-carbon electrodes can provide superior energy density compared with industry-standard graphite electrodes. Silicon-carbon electrodes can also have superior cycle life and initial coulombic efficiency compared with silicon electrodes comprised of silicon particles, conductive additives, and polymeric binders.

In some embodiments for making silicon composite electrodes, silicon particles can be suspended in an organic thermoplastic or thermoset binder and formed into a free-standing film, which can then be thermally treated to convert the organic material into carbon. The carbon matrix can act as an electrically conductive structural component which can hold the electrode together. In some such designs, it can be beneficial for the carbon to have intimate contact with the silicon particles. In order to achieve this intimate contact, it may be helpful for the silicon particles to be wetted (e.g., substantially wetted or fully wetted in some cases) by the carbon precursor (e.g., to achieve increased and/or maximum interfacial contact), and for the precursor to adhere strongly with the silicon particles. Without being bound by theory, if the silicon particles are not wetted by the carbon precursor, voids and/or porosity may appear at the interface between the silicon and the carbon, which may negatively impact the strength and conductivity of the composite.

As described herein, in some embodiments, silicon particles with customized surface chemistry may be used to improve the wetting by matching surface energy with the carbon precursor, and can promote strong adhesion by providing reactive sites on the silicon particle surface to enable one or more bonding interactions with the carbon precursor, such as pi-stacking, dipole-dipole interaction, hydrogen bonding, and/or covalent bonding.

Typical carbon anode electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce electrodes that are self-supported. The need for a metal foil current collector is eliminated or minimized because conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliampere hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Several types of silicon materials, e.g., silicon nanopowders, silicon nanowires, porous silicon, and ball-milled silicon, have also been reported as viable candidates as active materials for the negative or positive electrode. Small particle sizes (for example, sizes in the nanometer range) generally can increase cycle life performance. They also can display very high irreversible capacity. However, small particle sizes also can result in very low volumetric energy density (for example, for the overall cell stack) due to the difficulty of packing the active material. Larger particle sizes, (for example, sizes in the micrometer or micron range) generally can result in higher density anode material. However, the expansion of the silicon active material can result in poor cycle life due to particle cracking. For example, silicon can swell in excess of 300% upon lithium insertion. Because of this expansion, anodes including silicon should be allowed to expand while maintaining electrical contact between the silicon particles.

As described herein and in U.S. patent application Ser. No. 13/008,800 (U.S. Pat. No. 9,178,208) and Ser. No. 13/601,976 (U.S. Patent Application Publication No. 2014/0170498), entitled "Composite Materials for Electrochemical Storage" and "Silicon Particles for Battery Electrodes," respectively, the entireties of which are hereby incorporated by reference, certain embodiments utilize a method of creating monolithic, self-supported anodes using a carbonized polymer. Because the polymer is converted into an electrically conductive and electrochemically active matrix, the resulting electrode is conductive enough that a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

As described in U.S. patent application Ser. No. 14/821,586 (U.S. Patent Application Publication No. 2017/0040598), entitled "Surface Modification of Silicon Particles for Electrochemical Storage," the entirety of which is hereby incorporated by reference, in certain embodiments, carbonized polymer may react with a native silicon oxide surface layer on the silicon particles. In some embodiments, the surface of the particles is modified to form a surface coating thereon, which may further act as an expansion buffer for silicon particles during cycling. The surface coating may include silicon carbide.

The composite materials described herein can be used as an anode in most conventional lithium ion batteries; they may also be used as the cathode in some electrochemical couples with additional additives. The composite materials can also be used in either secondary batteries (e.g., rechargeable) or primary batteries (e.g., non-rechargeable). In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 (U.S. Patent Application Publication No. 2011/0020701), entitled "Carbon Electrode Structures for Batteries," the entirety of which is hereby incorporated by reference. Furthermore, the composite materials described herein can be, for example, silicon composite materials, carbon composite materials, and/or silicon-carbon composite materials. As described in U.S. patent application Ser. No. 13/799,405 (U.S. Pat. No. 9,553,303), entitled "Silicon Particles for Battery Electrodes," the entirety of which is hereby incorporated by reference, certain embodiments can further include composite materials including micron-sized silicon particles. For example, in some embodiments, the micron-sized silicon particles have nanometer-sized features on the surface. Silicon particles with such a geometry may have the benefits of both micron-sized silicon particles (e.g., high energy density) and nanometer-sized silicon particles (e.g., good cycling behavior).

As used herein, the term "silicon particles" in general can include micron-sized silicon particles with or without nanometer-sized features.

Some composite materials may be provided on a current collector. In some embodiments, the composite material can be attached to a current collector using an attachment substance. The attachment substance and current collector may be any of those known in the art or yet to be developed. For example, some composite materials can be provided on a current collector as described in U.S. patent application Ser. No. 13/333,864 (U.S. Pat. No. 9,397,338), entitled "Electrodes, Electrochemical Cells, and Methods of Forming Electrodes and Electrochemical Cells;" or U.S. patent application Ser. No. 13/796,922 (U.S. Pat. No. 9,583,757), entitled "Electrodes, Electrochemical Cells, and Methods of Forming Electrodes and Electrochemical Cells, each of which is incorporated by reference herein. Some anodes may be formed on a current collector, e.g., as described in U.S. patent application Ser. No. 15/471,860 (U.S. Patent Application Publication No. 2018/0287129), entitled "Methods of Forming Carbon-Silicon Composite Material on a Current Collector," which is incorporated by reference herein.

FIG. 1A illustrates one embodiment of a method of forming a composite material 100. For example, the method of forming a composite material can include forming a mixture including a precursor, block 101. The method can further include pyrolyzing the precursor to convert the precursor to a carbon phase. The precursor mixture may include carbon additives such as graphite active material, chopped or milled carbon fiber, carbon nanofibers, carbon nanotubes, and/or other carbons. After the precursor is pyrolyzed, the resulting carbon material can be a self-supporting monolithic structure. In certain embodiments, one or more materials are added to the mixture to form a composite material. For example, silicon particles can be added to the mixture. The carbonized precursor results in an electrochemically active structure that holds the composite material together. For example, the carbonized precursor can be a substantially continuous phase. The silicon particles, including micron-sized silicon particles with or without nanometer-sized features, may be distributed throughout the composite material. Advantageously, the carbonized precursor can be a structural material as well as an electrochemically active and electrically conductive material. In certain embodiments, material particles added to the mixture are homogenously or substantially homogeneously distributed throughout the composite material to form a homogeneous or substantially homogeneous composite.

The mixture can include a variety of different components. The mixture can include one or more precursors. In certain embodiments, the precursor is a hydrocarbon compound. For example, the precursor can include polyamide-imide, polyamic acid, polyimide, etc. Other precursors can include phenolic resins, epoxy resins, and/or other polymers. The mixture can further include a solvent. For example, the solvent can be N-methyl-pyrrolidone (NMP). Other possible solvents include acetone, diethyl ether, gamma butyrolactone, isopropanol, dimethyl carbonate, ethyl carbonate, dimethoxyethane, ethanol, methanol, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrrolidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor in the solvent is about 10 wt. % to about 30 wt. %. Additional materials can also be included in the mixture. For example, as previously discussed, silicon particles or carbon particles including graphite active material, chopped or milled carbon fiber, carbon nanofibers, carbon nanotubes, graphene, and other conductive carbons can be added to the mixture. In addition, the mixture can be mixed to homogenize the mixture.

In certain embodiments, the mixture is cast on a substrate, block 102 in FIG. 1A. In some embodiments, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent, block 103. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some embodiments, the substrate comprises polyethylene terephthalate (PET), including for example Mylar®. In certain embodiments, the dried mixture is a film or sheet. In some embodiments, the dried mixture is optionally cured, block 104. In some embodiments, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain embodiments, tape casting techniques can be used for the casting. In some embodiments, the mixture can be coated on a substrate by a slot die coating process (e.g., metering a constant or substantially constant weight and/or volume through a set or substantially set gap). In some other embodiments, there is no substrate for casting and the anode film does not need to be removed from any substrate. The dried mixture may be cut or mechanically sectioned into smaller pieces.

The mixture further goes through pyrolysis to convert the polymer precursor to carbon, block 105. In certain embodiments, the mixture is pyrolysed in a reducing atmosphere. For example, an inert atmosphere, a vacuum and/or flowing argon, nitrogen, or helium gas can be used. In some embodiments, the mixture is heated to about 900° C. to about 1350° C. For example, polyimide formed from polyamic acid can be carbonized at about 1175° C. for about one hour. In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein can be carried out in a continuous process. In certain embodiments, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon loses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

In some embodiments, the particle size (e.g., diameter or a largest dimension of the silicon particles) can be less than about 50 μm, less than about 40 μm, less than about 30 μm, less than about 20 μm, less than about 10 μm, less than about 1 μm, between about 10 nm and about 50 μm, between about 10 nm and about 40 μm, between about 10 nm and about 30 μm, between about 10 nm and about 20 μm, between about 0.1 μm and about 20 μm, between about 0.5 μm and about 20 μm, between about 1 μm and about 20 μm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. All, substantially all, or at least some of the silicon particles may comprise the particle size (e.g., diameter or largest dimension) described above. For example, an average particle size (or the average diameter or the average largest dimension) or a median particle size (or the median diameter or the median largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. In some embodiments, the silicon particles may have a distribution of particle sizes. For example, at least about 95%, at least about 90%, at least about 85%, at least about 80%, at least about 70%, or at least about 60% of the particles may have the particle size described herein.

The amount of silicon provided in the mixture or in the composite material can be greater than zero percent by weight of the mixture and/or composite material. In certain embodiments, the amount of silicon can be within a range of from about 0% to about 99% by weight of the composite material, including greater than about 0% to about 99% by weight, greater than about 0% to about 95% by weight, greater than about 0% to about 90%, greater than about 0% to about 35% by weight, greater than about 0% to about 25% by weight, from about 10% to about 35% by weight, at least about 30% by weight, from about 30% to about 99% by weight, from about 30% to about 95% by weight, from about 30% to about 90% by weight, from about 30% to about 80% by weight, at least about 50% by weight, from about 50% to about 99% by weight, from about 50% to about 95% by weight, from about 50% to about 90% by weight, from about 50% to about 80% by weight, from about 50% to about 70% by weight, at least about 60% by weight, from about 60% to about 99% by weight, from about 60% to about 95% by weight, from about 60% to about 90% by weight, from about 60% to about 80% by weight, at least about 70% by weight, from about 70% to about 99% by weight, from about 70% to about 95% by weight, from about 70% to about 90% by weight, etc.

Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size or a median particle size in the micron range and a surface including nanometer-sized features. In some embodiments, the silicon particles can have an average particle size (e.g., average diameter or average largest dimension) or a median particle size (e.g., median diameter or median largest diameter) between about 0.1 µm and about 30 µm or between about 0.1 µm and all values up to about 30 µm. For example, the silicon particles can have an average particle size or a median particle size between about 0.1 µm and about 20 µm, between about 0.5 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 20 µm, between about 1 µm and about 15 µm, between about 1 µm and about 10 µm, between about 5 µm and about 20 µm, etc. Thus, the average particle size or the median particle size can be any value between about 0.1 µm and about 30 µm, e.g., 0.1 µm, 0.5 µm, 1 µm, 5 µm, 6 µm, 7 µm, 8 µm, 9 µm, 10 µm, 15 µm, 20 µm, 25 µm, and 30 µm.

The nanometer-sized features can include an average feature size (e.g., an average diameter or an average largest dimension) between about 1 nm and about 1 µm, between about 1 nm and about 750 nm, between about 1 nm and about 500 nm, between about 1 nm and about 250 nm, between about 1 nm and about 100 nm, between about 10 nm and about 500 nm, between about 10 nm and about 250 nm, between about 10 nm and about 100 nm, between about 10 nm and about 75 nm, or between about 10 nm and about 50 nm. The features can include silicon.

The amount of carbon obtained from the precursor can be about 50 weight percent from polyamic acid. In certain embodiments, the amount of carbon obtained from the precursor in the composite material can be greater than 0% to about 95% by weight such as about 1% to about 95% by weight, about 1% to about 90% by weight, 1% to about 80% by weight, about 1% to about 70% by weight, about 1% to about 60% by weight, about 1% to about 50% by weight, about 1% to about 40% by weight, about 1% to about 30% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor.

The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. In some embodiments, the amount of hard carbon in the composite material can have a value within a range of greater than 0% to about 95% by weight such as about 1% to about 95% by weight, about 1% to about 90% by weight, about 1% to about 80% by weight, about 1% to about 70% by weight, about 1% to about 60% by weight, about 1% to about 50% by weight, about 1% to about 40% by weight, about 1% to about 30% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. In some embodiments, the amount of hard carbon in the composite material can be about 1% by weight, about 5% by weight, about 10% by weight, about 20% by weight, about 30% by weight, about 40% by weight, about 50% by weight, or more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments heating the mixture to a desired pyrolysis temperature may further result in the surface modification of silicon particles present in the mixture. In some embodiments pyrolysis of the mixture may result in the formation of a surface coating on at least 50% of the silicon particles present in the mixture. In some embodiments pyrolysis of the mixture may result in the formation of a surface coating on at least 60%, 70%, 80%, 90% or 99% of the silicon particles present in the mixture. In some embodiments, the surface coatings form a substantially continuous layer on the silicon particles.

In some embodiments, the carbonized precursor or resin may contact the surface of the silicon particles. In certain embodiments, the carbonized precursor in contact with the silicon particle surface may be one or more types of carbon phases resulting from pyrolysis of the precursor. The one or more types of carbon phases of the carbonized precursor in contact with the silicon particle surface may react with the silicon particles during pyrolysis to thereby form silicon carbide on the silicon particle surface. Therefore, in some embodiments, the surface coatings may comprise carbon, silicon carbide, and/or a mixture of carbon and silicon carbide.

In some embodiments, as described further below, the silicon particles present in the mixture may comprise a native silicon oxide (SiO, $SiO_2$, SiOx) surface layer. In certain embodiments, the carbonized precursor in contact with the silicon particle surface may react with the naturally occurring native silicon oxide surface layer to form silicon carbide. In some embodiments the carbonized precursor in contact with the silicon particle surface may react with substantially all of the native silicon oxide layer to form silicon carbide. Therefore, the surface coatings on the silicon particles may comprise, in some embodiments, carbon and silicon carbide, wherein the surface coating is substantially free of silicon oxide. In some embodiments a first portion of the surface coatings may comprise silicon carbide while a second portion may comprise a mixture of silicon carbide and carbon. In some other embodiments, the carbonized precursor in contact with the silicon particle surface may not fully convert the native silicon oxide layer to silicon carbide, and the resultant surface coating or coatings may comprise carbon, silicon carbide, and one or more silicon oxides, such as SiO, $SiO_2$, and $SiO_x$. In some embodiments, the carbonized precursor in contact with the silicon particle surface may be completely reacted, resulting in surface coatings that comprise silicon carbide. In some embodiments substantially all of the surface coatings may comprise silicon carbide. In some embodiments, such surface coatings may be substantially free of silicon oxide and/or carbon.

In certain embodiments, the pyrolyzed mixture can include silicon particles having carbon and/or silicon carbide surface coatings creating a silicon-carbon-silicon carbide (e.g., at least one first phase comprising silicon, at least one second phase comprising carbon, and at least a third phase comprising silicon carbide) or silicon-carbon-carbon-silicon carbide (e.g., at least one first phase comprising silicon, at least one second phase comprising carbon, at least one third phase comprising carbon, and at least a fourth phase comprising silicon carbide) composite material.

Additionally, surface coatings on the silicon particles described herein can help to constrain the outward expansion of the silicon particle during lithiation. By constraining outward particle expansion during lithiation, the surface coatings can help prevent mechanical failure of the silicon particles and ensure good electrical contact. The surface coatings can further enhance the electronic charge transfer within the electrode. Controlled and optimized surface modification of silicon particles in the anode may also significantly improve capacity retention during cycling of an associated battery cell.

Moreover, the surface coatings substantially affect the reactions that occur between the anode materials and the electrolyte within a battery. The surface coatings can help reduce unwanted reactions. During high temperature pyrolysis, the formed surface coatings and the removal of unwanted native oxide ($SiO_2$) via conversion into more stable and unreactive SiC can provide higher reversible capacity with minimized irreversible capacity loss. Irreversible capacity loss can be due to formation and build-up of a solid electrolyte interface (SEI) layer that consumes lithium. This becomes a more prominent issue for silicon particles because nano- and micro-scale silicon particles have large surface areas and larger silicon particles tend to pulverize during lithiation and delithiation which can introduce additional particle surface area. Additionally, irreversible capacity loss can be due to the reaction of lithium with undesirable native silicon oxides (Equation 1) which are unavoidable during processing and storage of silicon anode materials.

$$SiO_x + yLi + ye^- \rightarrow Si + Li_yO_x \quad \text{(Equation 1)}$$

Therefore, the surface modification of the silicon particles by carbon and/or silicon carbide may aid in the formation of a relatively stable solid electrolyte interface layer and may reduce or eliminate the undesirable reaction of lithium with native silicon oxides on the Si particle surface (Equation 1).

FIG. 1B is a schematic illustration of the formation of silicon carbide on a silicon particle as described above. Initially, a silicon particle comprising a native silicon oxide surface layer is provided in a mixture comprising a precursor as described above. In some embodiments, the mixture is pyrolyzed in a reducing atmosphere. For example, a reducing atmosphere, a vacuum and/or flowing gas including $H_2$, CO, or hydrocarbon gas can be used. In some embodiments, the mixture is heated to about 500° C. to about 1350° C. In some embodiments, the mixture is heated to about 800° C. to about 1200° C. In some embodiments, the mixture is heated to about 1175° C.

The pyrolyzed precursor in contact with the surface of the silicon particle reacts with the native silicon oxide layer of the silicon particle to form silicon carbide. The carbonized precursor in contact with the silicon particle surface is depicted here as continuous and conformal, but may not be continuous or conformal in some other embodiments. Further, in some embodiments, the silicon carbide layer formed from the reaction between the native silicon oxide layer and the carbonized precursor in contact with the silicon particle surface may take the form of a coating or dispersion within the composite anode film. As shown in FIG. 1B, in some embodiments the silicon carbide may not be continuous or conformal on the silicon particle, however in some other embodiments the silicon carbide may be a continuous and/or conformal coating.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the particle size (e.g., a diameter or a largest dimension) of the graphite particles can be between about 0.5 microns and about 20 microns. All, substantially all, or at least some of the graphite particles may comprise the particle size (e.g., diameter or largest dimension) described herein. In some embodiments, an average or median particle size (e.g., diameter or largest dimension) of the graphite particles can be between about 0.5 microns and about 20 microns. In some embodiments, the graphite particles may have a distribution of particle sizes. For example, at least about 95%, at least about 90%, at least about 85%, at least about 80%, at least about 70%, or at least about 60% of the particles may have the particle size described herein. In certain embodiments, the composite material can include graphite particles in an amount greater than 0% and less than about 80% by weight, including from about 40% to about 75% by weight, from about 5% to about 30% by weight, from about 5% to about 25% by weight, from about 5% to about 20% by weight, from about 5% to about 15% by weight, etc.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a particle size (e.g., diameter or a largest dimension) of the conductive particles can be between about 10 nanometers and about 7 micrometers. All, substantially all, or at least some of the conductive particles may comprise the particle size (e.g., diameter or largest dimension) described herein. In some embodiments, an average or median particle size (e.g., diameter or largest dimension) of the conductive particles can be between about 10 nm and about 7 micrometers. In some embodiments, the conductive particles may have a distribution of particle sizes. For example, at least about 95%, at least about 90%, at least about 85%, at least about 80%, at least about 70%, or at least about 60% of the particles may have the particle size described herein.

In certain embodiments, the mixture can include conductive particles in an amount greater than zero and up to about 80% by weight. In further embodiments, the composite material can include about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

In certain embodiments, an electrode can include a composite material described herein. For example, a composite material can form a self-supported monolithic electrode. The pyrolysed carbon phase (e.g., hard carbon phase) of the composite material can hold together and structurally support the particles that were added to the mixture. In certain embodiments, the self-supported monolithic electrode does not include a separate collector layer and/or other supportive structures. In some embodiments, the composite material and/or electrode does not include a polymer beyond trace amounts that remain after pyrolysis of the precursor. In further embodiments, the composite material and/or electrode does not include a non-electrically conductive binder. The composite material may also include porosity, such as about 1% to about 70% or about 5% to about 50% by volume porosity. For example, the porosity can be about 5% to about 40% by volume porosity.

In some embodiments, the composite material can be attached to a current collector. In some embodiments, the composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In certain embodiments, an electrode in a battery or electrochemical cell can include a composite material, including composite material with the silicon particles described herein. For example, the composite material can be used for the anode and/or cathode. In certain embodiments, the battery is a lithium ion battery. In further embodiments, the battery is a secondary battery, or in other embodiments, the battery is a primary battery.

Furthermore, the full capacity of the composite material may not be utilized during use of the battery to improve life of the battery (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 3000 mAh/g, while the composite material may only be used up to an gravimetric capacity of about 550 to about 1500 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 50% of the composite material's maximum gravimetric capacity or below about 30% of the composite material's maximum gravimetric capacity.

Silicon Particles

Described herein are silicon particles for use in battery electrodes (e.g., anodes and cathodes). Anode electrodes currently used in the rechargeable lithium-ion cells typically have a specific capacity of approximately 200 milliampere hours per gram (including the metal foil current collector, conductive additives, and binder material). Graphite, the active material used in most lithium ion battery anodes, has a theoretical energy density of 372 milliampere hours per gram (mAh/g). In comparison, silicon has a high theoretical capacity of 4200 mAh/g. Silicon, however, swells in excess of 300% upon lithium insertion. Because of this expansion, anodes including silicon should be able to expand while allowing for the silicon to maintain electrical contact with the silicon.

Some embodiments provide silicon particles that can be used as an electro-chemically active material in an electrode. The electrode may include binders and/or other electro-chemically active materials in addition to the silicon particles. For example, the silicon particles described herein can be used as the silicon particles in the composite materials described herein. In another example, an electrode can have an electro-chemically active material layer on a current collector, and the electro-chemically active material layer includes the silicon particles. The electro-chemically active material may also include one or more types of carbon.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

In certain embodiments, the silicon particles can have an average particle size, for example an average diameter or an average largest dimension, between about 10 nm and about 40 μm as described herein. Further embodiments can include average particle sizes of between about 1 μm and about 15 μm, between about 10 nm and about 1 μm, and between about 100 nm and about 10 μm. Silicon particles of various sizes can be separated by various methods such as by air classification, sieving or other screening methods. For example, a mesh size of 325 can be used separate particles that have a particle size less than about 44 μm from particles that have a particle size greater than about 44 μm.

Furthermore, the silicon particles may have a distribution of particle sizes. For example, at least about 90% of the particles may have particle size, for example a diameter or a largest dimension, between about 10 nm and about 40 μm, between about 1 μm and about 15 μm, between about 10 nm and about 1 μm, and/or larger than 200 nm.

In some embodiments, the silicon particles may have an average surface area per unit mass of between about 1 to about 100 m$^2$/g, about 1 to about 80 m$^2$/g, about 1 to about 60 m$^2$/g, about 1 to about 50 m$^2$/g, about 1 to about 30 m$^2$/g, about 1 to about 10 m$^2$/g, about 1 to about 5 m$^2$/g, about 2 to about 4 m$^2$/g, or less than about 5 m$^2$/g.

In certain embodiments, the silicon particles are at least partially crystalline, substantially crystalline, and/or fully crystalline. Furthermore, the silicon particles may be substantially pure silicon.

Figure 2B:
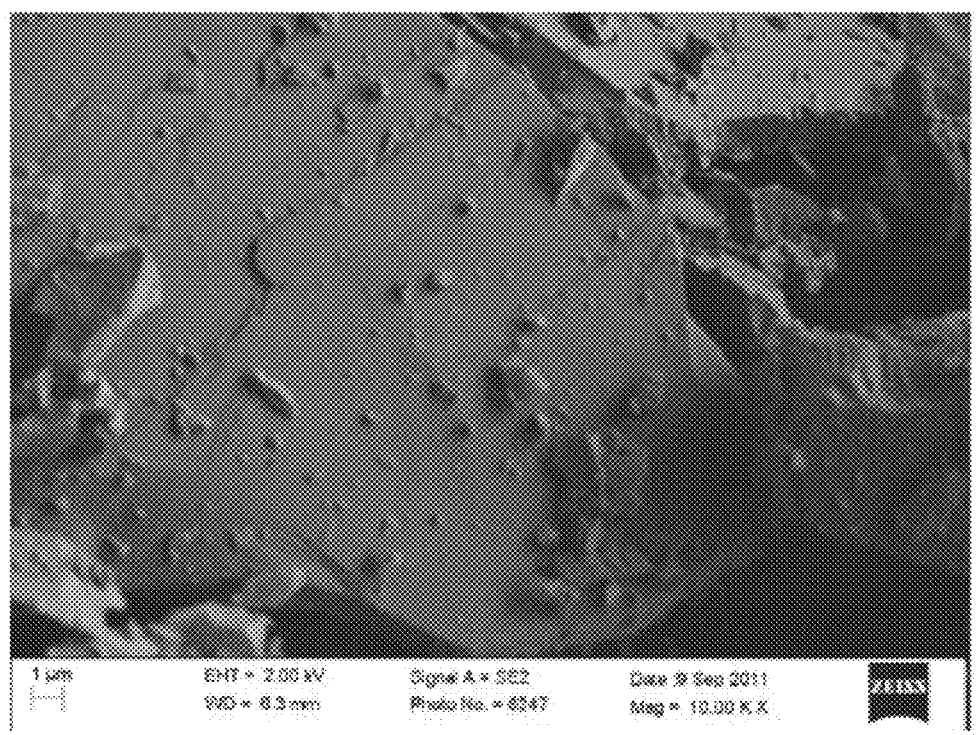

Compared with the silicon particles used in conventional electrodes, the silicon particles described herein for some embodiments can generally have a larger average particle size. In some embodiments, the average surface area of the silicon particles described herein can be generally smaller. Without being bound to any particular theory, the lower surface area of the silicon particles described herein may contribute to the enhanced performance of electrochemical cells. Typical lithium ion type rechargeable battery anodes would contain nano-sized silicon particles. In an effort to further increase the capacity of the cell, smaller silicon particles (such as those in nano-size ranges) are being used for making the electrode active materials. In some cases, the silicon particles are milled to reduce the size of the particles. Sometimes the milling may result in roughened or scratched particle surface, which also increases the surface area. However, the increased surface area of silicon particles may actually contribute to increased degradation of electrolytes, which lead to increased irreversible capacity loss. FIGS. 2A and 2B are SEM micrographs of an example embodiment of silicon particles milled-down from larger silicon particles. As shown in the figures, certain embodiments may have a roughened surface.

Figure 2C:
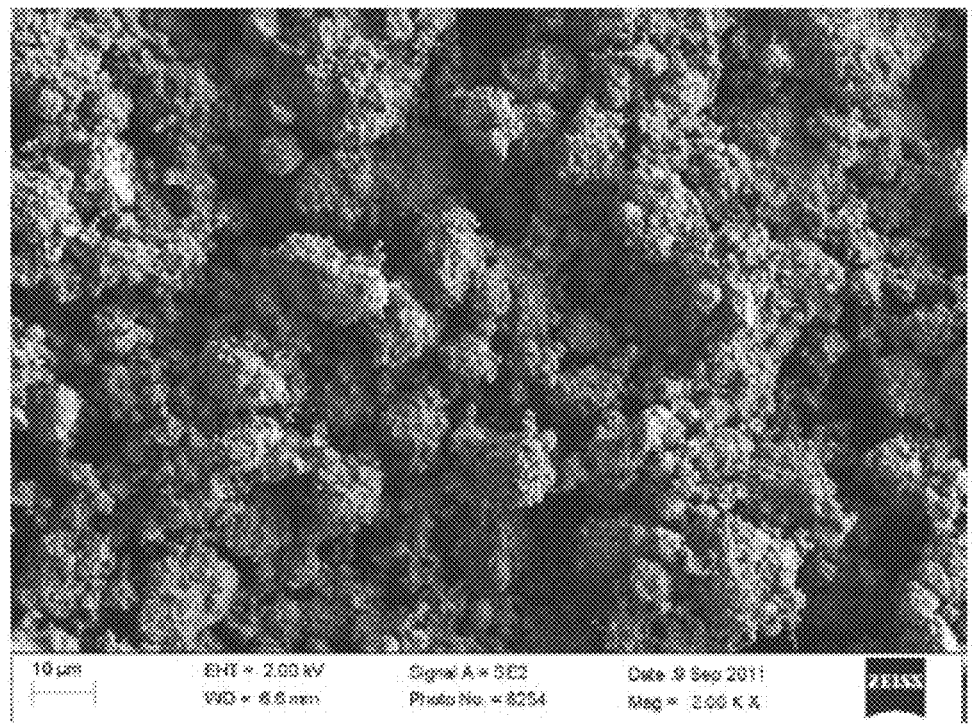
FIGS. 2C and 2D are SEM micrographs of one embodiment of micron-sized silicon particles with nanometer-sized features on the surface.
Figure 2D:
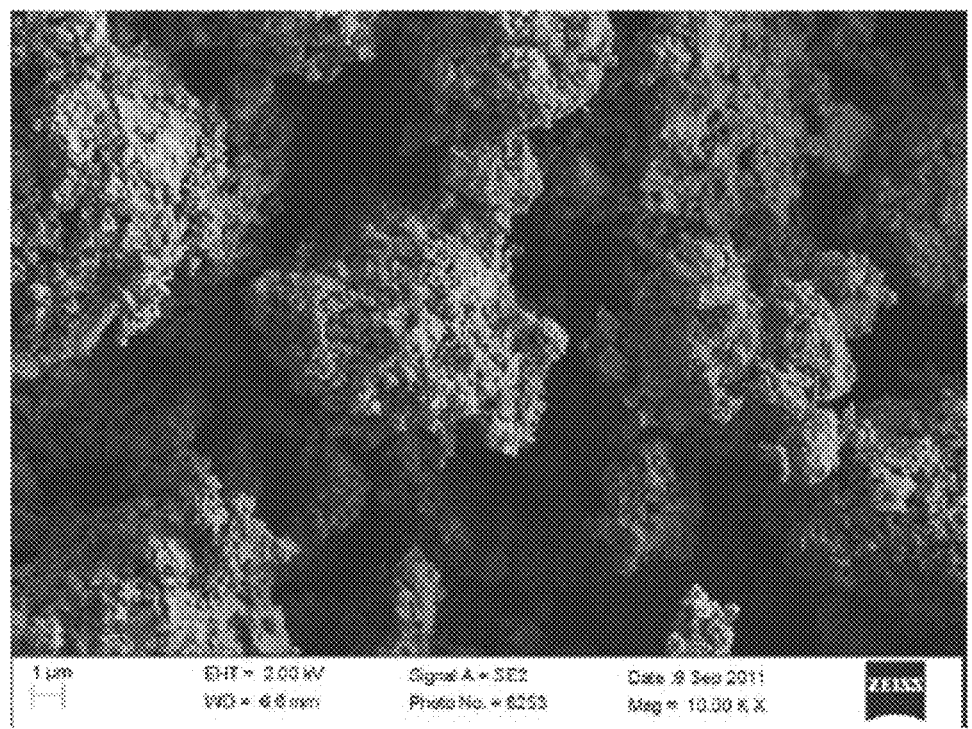

As described herein, certain embodiments include silicon particles with surface roughness in nanometer-sized ranges, e.g., micron-sized silicon particles with nanometer-sized features on the surface. FIGS. 2C and 2D are SEM micrographs of an example embodiment of such silicon particles. Various such silicon particles can have an average particle size (e.g., an average diameter or an average largest dimension) in the micron range (e.g., as described herein, between about 0.1 μm and about 30 μm) and a surface including nanometer-sized features (e.g., as described herein, between about 1 nm and about 1 μm, between about 1 nm and about 750 nm, between about 1 nm and about 500 nm, between about 1 nm and about 250 nm, between about 1 nm and about 100 nm, between about 10 nm and about 500 nm, between about 10 nm and about 250 nm, between about 10 nm and about 100 nm, between about 10 nm and about 75 nm, or between about 10 nm and about 50 nm). The features can include silicon.

Compared to the example embodiment shown in FIGS. 2A and 2B, silicon particles with a combined micron/nanometer-sized geometry (e.g., FIGS. 2C and 2D) can have a higher surface area than milled-down particles. Thus, the silicon particles to be used can be determined by the desired application and specifications.

Even though certain embodiments of silicon particles have nanometer-sized features on the surface, the total surface area of the particles can be more similar to micron-sized particles than to nanometer-sized particles. For example, micron-sized silicon particles (e.g., silicon milled-down from large particles) typically have an average surface area per unit mass of over about 0.5 m$^2$/g and less than about 2 m$^2$/g (for example, using Brunauer Emmet Teller (BET) particle surface area measurements), while nanometer-sized silicon particles typically have an average surface area per unit mass of above about 100 m$^2$/g and less than about 500 m$^2$/g. Certain embodiments described herein can have an average surface area per unit mass between about 1 m$^2$/g and about 30 m$^2$/g, between about 1 m$^2$/g and about 25 m$^2$/g, between about 1 m$^2$/g and about 20 m$^2$/g, between about 1 m$^2$/g and about 10 m$^2$/g, between about 2 m$^2$/g and about 30 m$^2$/g, between about 2 m$^2$/g and about 25 m$^2$/g, between about 2 m$^2$/g and about 20 m$^2$/g, between about 2 m$^2$/g and about 10 m$^2$/g, between about 3 m$^2$/g and about 30 m$^2$/g, between about 3 m$^2$/g and about 25 m$^2$/g, between about 3 m$^2$/g and about 20 m$^2$/g, between about 3 m$^2$/g and about 10 m$^2$/g (e.g., between about 3 m$^2$/g and about 6 m$^2$/g), between about 5 m$^2$/g and about 30 m$^2$/g, between about 5 m$^2$/g and about 25 m$^2$/g, between about 5 m$^2$/g and about 20 m$^2$/g, between about 5 m$^2$/g and about 15 m$^2$/g, or between about 5 m$^2$/g and about 10 m$^2$/g.

Figure 2E:
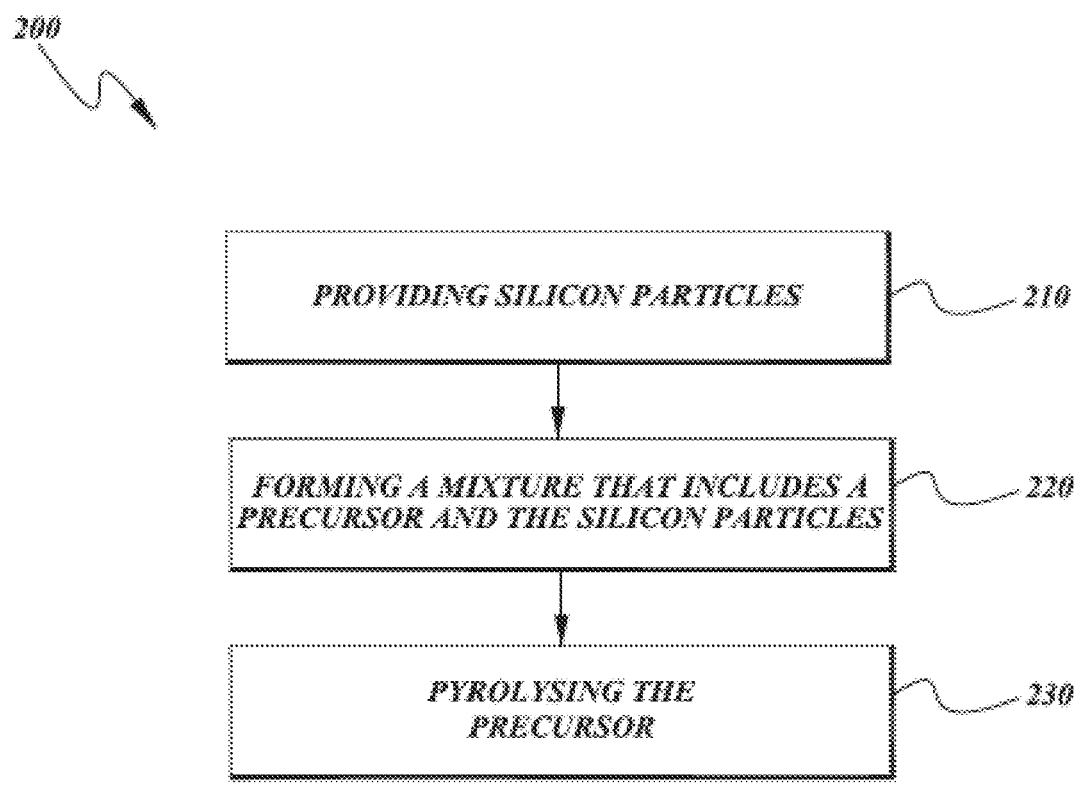
FIG. 2E illustrates an example embodiment of a method of forming a composite material.

Various examples of micron-sized silicon particles with nanometer-sized features can be used to form certain embodiments of composite materials as described herein. For example, FIG. 2E illustrates an example method 200 of forming certain embodiments of the composite material. The method 200 includes providing a plurality of silicon particles (for example, silicon particles having an average particle size between about 0.1 μm and about 30 μm and a surface including nanometer-sized features), block 210. The method 200 further includes forming a mixture that includes a precursor and the plurality of silicon particles, block 220. The method 200 further includes pyrolysing the precursor, block 230, to convert the precursor into one or more types of carbon phases to form the composite material.

With respect to block 210 of method 200, silicon with the characteristics described herein can be synthesized as a product or byproduct of a Fluidized Bed Reactor (FBR) process. For example, in the FBR process, useful material can be grown on seed silicon material. Typically, particles can be removed by gravity from the reactor. Some fine particulate silicon material can exit the reactor from the top of the reactor or can be deposited on the walls of the reactor. The material that exits the top of the reactor or is deposited on the walls of the reactor (e.g., byproduct material) can have nanoscale features on a microscale particle. In some such processes, a gas (e.g., a nitrogen carrier gas) can be passed through the silicon material. For example, the silicon material can be a plurality of granular silicon. The gas can be passed through the silicon material at high enough velocities to suspend the solid silicon material and make it behave as a fluid. The process can be performed under an inert atmosphere, e.g., under nitrogen or argon. In some embodiments, silane gas can also be used, for example, to allow for metal silicon growth on the surface of the silicon particles. The growth process from a gas phase can give the silicon particles the unique surface characteristics, e.g., nanometer-sized features. Since silicon usually cleaves in a smooth shape, e.g., like glass, certain embodiments of silicon particles formed using the FBR process can advantageously acquire small features, e.g., in nanometer-sized ranges, that may not be as easily achievable in some embodiments of silicon particles formed by milling from larger silicon particles.

In addition, since the FBR process can be under an inert atmosphere, very high purity particles (for example, higher than 99.9999% purity) can be achieved. In some embodiments, purity of between about 99.9999% and about 99.999999% can be achieved. In some embodiments, the FBR process can be similar to that used in the production of solar-grade polysilicon while using 85% less energy than the traditional Siemens method, where polysilicon can be formed as trichlorosilane decomposes and deposits additional silicon material on high-purity silicon rods at 1150° C. Because nanometer-sized silicon particles have been shown to increase cycle life performance in electrochemical cells, micron-sized silicon particles have not been contemplated for use as electrochemical active materials in electrochemical cells.

With respect to blocks 220 and 230 of method 200, forming a mixture that includes a precursor and the plurality of silicon particles, block 220, and pyrolysing the precursor, block 230, to convert the precursor into one or more types of carbon phases to form the composite material can be similar to blocks 101 and 105 respectively, of method 100 described herein. In some embodiments, pyrolysing (e.g., at about 900° C. to about 1350° C.) occurs at temperatures below the melting point of silicon (e.g., at about 1414° C.) without affecting the nanometer-sized features of the silicon particles.

In accordance with certain embodiments described herein, certain micron-sized silicon particles with nanometer surface feature can achieve high energy density, and can be used in composite materials and/or electrodes for use in electro-chemical cells to improve performance during cell cycling.

Surface Modification of Silicon Particles

As described herein, silicon particles may be used as electrochemically active material in an electrode. In some embodiments, the silicon particles may be used in silicon-carbon composite electrodes. The electrodes can be formed by pyrolyzing a mixture comprising carbon precursor and silicon particles to convert the carbon precursor into one or more carbon phases to form a composite material film with the silicon particles distributed throughout the composite material film. Without being bound by theory, the surfaces of the silicon particles can be modified to improve wetting by the carbon precursor, thereby improving the adhesion with the carbon precursor and decreasing the amount of porosity in the silicon-carbon interface. As a result, the silicon-carbon composite electrode can have greater physical strength, greater conductivity, and better cycling performance in batteries.

Figure 3A:
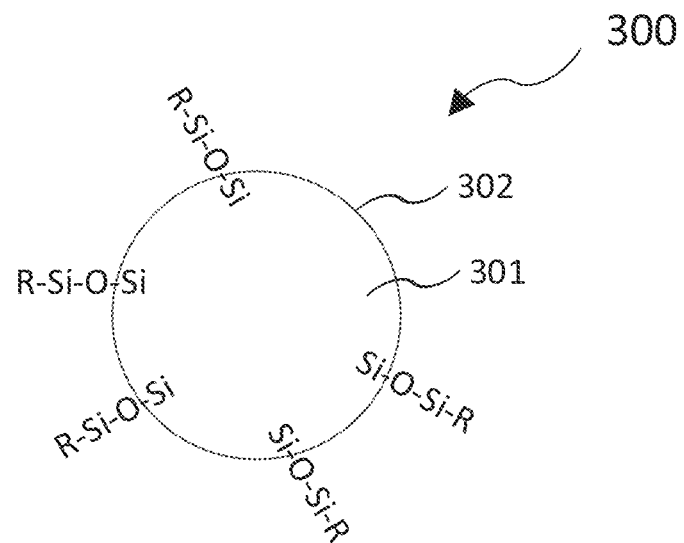
FIG. 3A schematically illustrates an example silane-treated silicon particle.

FIG. 3A schematically illustrates an example surface modified silicon particle 300 that can be used as active material in silicon-composite electrodes, e.g., in lithium-ion batteries. The example silicon particle 300 comprises bulk material 301 and a surface 302. The surface 302 can be modified by silane treatment as will be described further and indicated by Si—O—Si bonds on the surface 302. For simplicity, bonds are illustrated as Si—O—Si—R, but may include other bonds, elements, and/or functional groups.

For simplicity, the silicon particle 300 in FIG. 3A is illustrated as having a circular cross-sectional shape such as for a spherical or cylindrical particle. However, it would be understood that "silicon particle" 300 described herein can have any regular or irregular cross-sectional shape and is not limited to a spherical or cylindrical particle. The silicon particle 300 can be any size as described herein, e.g., having a largest diameter or dimension from about 10 nm to about 50 μm, having a largest diameter or dimension from about 1 μm to about 50 μm, etc.

With continued reference to FIG. 3A, the bulk material 301 can have any characteristic of any of the silicon particles described herein. For example, the bulk material 301 may or may not be pure silicon. For example, the bulk material 301 can be substantially silicon or can be a silicon alloy (e.g., silicon as the primary constituent along with one or more other elements). In some embodiments, the bulk material 301 can be from about 90% pure silicon to about 99.9999% pure silicon. In some instances, the bulk material 301 can be substantially pure silicon. In some embodiments, the bulk material 301 can be at least partially crystalline, substantially crystalline, and/or fully crystalline. In some instances, the surface 302 can include a native and/or artificially created oxide layer (e.g., SiO, $SiO_2$, SiOx, SiOH). Surface oxidation may be done in the presence or absence of water, e.g., between about 100° C. and about 1200° C.

In various embodiments, the surface 302 can be modified using one or more silicon-containing organic compounds, e.g., organosilanes. In some instances, organosilanes can react with the silicon's native and/or artificially created oxide. For example, one or more organosilanes can react with silanol groups on the silicon surface 302 to form bonds (e.g., Si—O—Si) between the silanol groups and organosilane. The organosilane may contain a range of functional groups, including but not limited to: silanols (R—Si—OH), silyl ethers (R—Si—OR'), silyl chlorides (R—Si—Cl), dialkylaminosilanes (R—Si—$NR_2$), silyl hydrides (R—$SiH_3$), and/or cyclic azasilanes.

The "R" region of the organosilane may have one or more functional groups tailored to the specific components used in the preparation of the silicon composite electrodes. For example, to improve wetting and bonding with polyimide materials, an amino alkyl functional group can be used, such as those present in 3-aminopropyltriethoxysilane, N-(2-aminoethyl)-3-aminopropyltrimethoxysilane (AEAPTMS), or 2,2-dimethoxy-1,6-diaza-2-silacyclooctane. Shown below is the molecular structure of 3-aminopropyltriethoxysilane, a silyl ether with an amine function group.

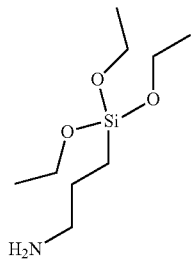

The molecular structure of N-(2-aminoethyl)-3-aminopropyltrimethoxysilane, a silyl ether with a diamine functional group is shown below.

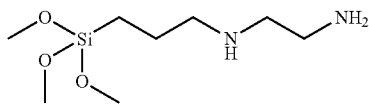

The molecular structure of 2,2-dimethoxy-1,6-diaza-2-silacyclooctane, a cyclic azasilane is shown below.

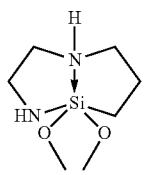

To improve wetting and bonding to phenolic resins, an epoxide linker may be used. Shown below is the molecular structure of an example epoxide linker, 5,6-epoxyhexyltriethoxysilane, a silyl ether with an epoxide functional group.

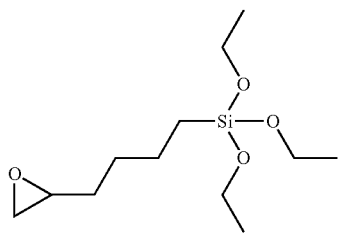

For materials containing polycyclic aromatic hydrocarbon (such as pitch or tar), an organosilane with an aromatic functional group may be used. An example of such an organosilane is benzyltriethoxysilane, a silyl ether with an aromatic function group. The molecular structure is shown below.

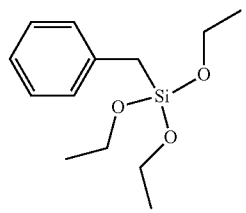 [SMILES: CCO[Si](Cc1ccccc1)(OCC)OCC]

In some embodiments, the organosilane can include a silyl hydride (R—SiH$_3$). For example, the molecular structure of dodecylsilane is shown below.

In some embodiments, the organosilane can include a dialkylaminosilane (R—Si—NR$_2$). For example, the molecular structure of (N,N-dimethylamino)trimethylsilane is shown below.

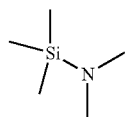

In various embodiments, the silane-treated silicon particle 300 can include a silicon oxide surface reacted with one or more organosilanes. For example, the surface 302 of the silicon particle 300 can include bonds between the surface silanol groups and organosilane. There can be different reaction mechanisms for each class of organosilane. Without being bound by theory, the general principle is that the silanol groups on the silicon particle surface 302 participate in nucleophilic substitution reactions with the organosilane. In the case of a silyl chloride, reactions can take place via a substitution of the chloride group, forming a new Si—O—Si bond between the silicon particle and the organosilane, producing HCl as a byproduct. In the case of silyl ethers, reaction mechanisms can involve a similar direct substitution reaction, producing an alcohol. Alternatively or additionally, reaction mechanisms can involve a two-step mechanism involving 1) hydrolysis of the silyl ether to produce an alcohol and a silanol and 2) a condensation reaction between the organosilanol and the particle surface silanol to form a new Si—O—Si bond and water as a byproduct. Similar nucleophilic substitution reaction mechanisms can apply to the dialkylaminosilanes (e.g., producing Si—O—Si and a secondary amine), silyl hydrides (e.g., forming hydrogen), or cyclic azasilanes (e.g., re-arranging to form linear organosilanes). Multifunctional silyl ethers (for example, AEAPTMS) or silanols can participate in a certain amount of polymerization at the silicon surface, as each silanol (or hydrolyzed silyl ether) can condense to form Si—O—Si with another silanol.

The surface modification can be carried out using several different approaches. In some examples, the silicon may be suspended in a heated liquid containing a certain concentration of an organosilane. In some instances, the liquid can be heated to a temperature in the range of about 50° C. to about 200° C. or any range within this range (e.g., about 50° C. to about 100° C., about 50° C. to about 150° C., about 50° C. to about 175° C., about 75° C. to about 200° C., about 100° C. to about 200° C., about 150° C. to about 200° C., etc.). This method can be used for silyl ethers and silyl chlorides. The liquid may be water, an organic solvent, or a mixture of water and organic solvents. In some instances, some water can be used for silyl ethers. In some instances, little or substantially no water can be used for silyl chlorides. As another example, the silicon may be modified by exposure to organosilane vapors, e.g., either while spread into thin layers in trays or while agitated in a reactor vessel. Other examples are possible.

The amount of organosilane can be tied to the specific surface area of the silicon and/or the specific wetting surface of the organosilane. For example, a silicon material with a specific surface area of 0.6 $m^2/g$ and an organosilane with a specific wetting surface of 358 $m^2/g$ can use a ratio of about 1.68 g organosilane per kilogram of silicon in some instances.

As described herein, various examples of silane-treated silicon particles can be used to form certain embodiments of composite materials as described herein. For example, the composite material can be used in an electrode for use in an electrochemical cell.

Certain embodiments can include a composite material film. The composite material film can include any of the examples of composite material films described herein. For example, the composite material film can have greater than 0% to about 99% by weight of silicon particles (e.g., about 50% to about 99% by weight, about 60% to about 99% by weight, about 70% to about 99% by weight, about 75% to about 99% by weight, about 80% to about 99% by weight, etc.), or greater than 0% and to about 95% by weight of silicon particles (e.g., about 50% to about 95% by weight, about 60% to about 95% by weight, about 70% to about 95% by weight, about 75% to about 95% by weight, about 80% to about 95% by weight, etc.). The silicon particles can include surface treated silicon particles and/or a combination of surface treated and untreated silicon particles. The treated or untreated silicon particles can include any of the silicon particles described herein (e.g., silicon particles with an average particle size from about 0.1 μm to about 40 μm, silicon particles with an average particle size from about 1 μm to about 20 μm, micron-sized silicon particles with nanometer-sized features, etc.).

The organic portion of the organosilane can interact with carbon precursors via various mechanisms, e.g., depending on which organosilane and which precursor is used. For example, an organosilane with a primary amine group (such as AEAPTMS) may react with a precursor containing a carboxylic acid group (such as polyamic acid) to form an amide bond. Other interactions are possible as well. Using the same example of AEAPTMS and polyamic acid (or polyimide), the primary amine group in the organosilane may participate in hydrogen bonding with the carbonyl groups in the polyamic acid (or polyimide).

Without being bound by theory, the Si—O—Si bonds can be relatively thermally stable such that at least a Si—O—Si monolayer can remain on the silicon particle surface after pyrolysis, e.g., at about 900° C. to about 1350° C. With a multifunctional silyl ether, the Si—O—Si domain may be a few layers thick depending on the reaction conditions. The organic portion of the organosilane may pyrolyze following similar mechanisms to the carbon precursor, forming hydrogen gas, water, carbon monoxide, carbon dioxide, cyanide, and/or carbon, depending on the composition and the conditions.

The composite material film can also have greater than 0% and to about 90% by weight of one or more types of carbon phases. The one or more types of carbon phases can be a substantially continuous phase. In some instances, the continuous phase can hold the composite material film together. In some embodiments, the one or more types of carbon phases can be electrochemically active and/or electrically conductive. In some embodiments, the silicon particles can be distributed throughout the composite material film.

As described herein, the silicon particles can have surface coatings. In some embodiments, the surface coatings can cover at least about 50%, 60%, 70%, 80%, 90%, or 99% of the silicon particles. In some embodiments, the surface coatings can be a substantially continuous layer. In some embodiments, the surface coatings can include silicon monoxide (SiO), silicon dioxide ($SiO_2$), and/or silicon oxide ($SiO_x$). During pyrolysis, some, substantially all, or all of the silicon oxide on the surface of the silicon particle may be converted into silicon carbide.

In various embodiments, the composite material film can include an interfacial region between the silicon particles and the one or more types of carbon phases. The interfacial region can include silicon, carbon, silicon oxide, silicon carbide, silicon oxycarbide, or a mixture of these materials, with or without dopants. The modified surfaces of the silicon particles can improve wetting by the carbon precursor, thereby improving the adhesion with the carbon precursor and decreasing porosity in the silicon-carbon interface. In some embodiments, the interfacial region can include less than or equal to about 30%, 25%, 20%, 15%, 10%, or 5% porosity. Advantageously, by having less porosity, the strength and conductivity of the composite material can increase. In various embodiments, the composite material film can be self-supported. In some embodiments, the composite material film can be attached to a current collector. The composite material film can be used as an electrode (e.g., anode or cathode).

Figure 3B:
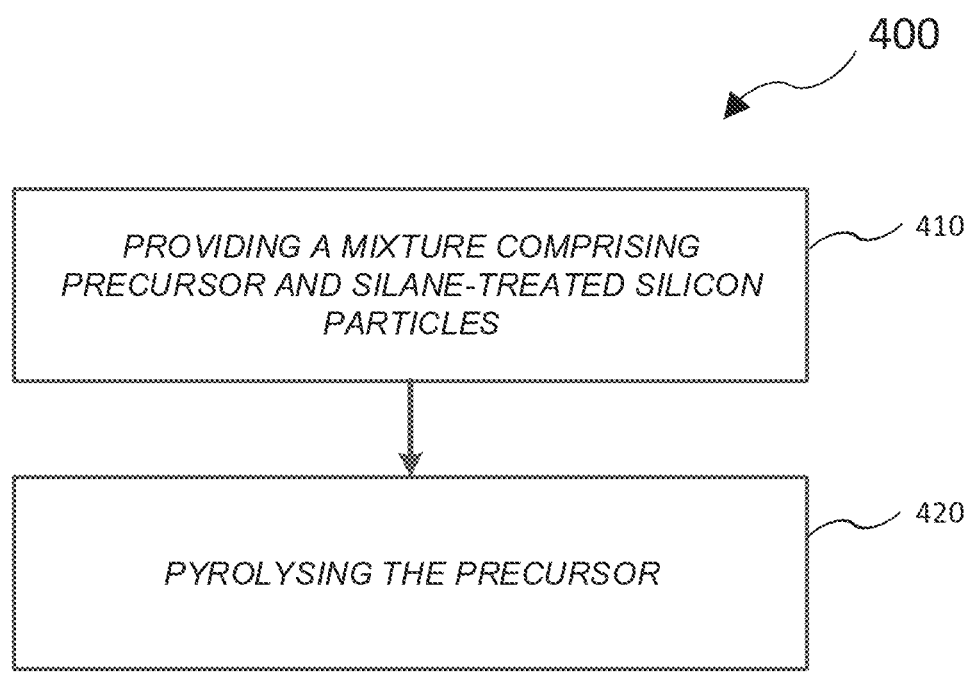
FIG. 3B illustrates an example embodiment of a method of forming a composite material.

FIG. 3B illustrates an example method 400 of forming certain embodiments of a composite material. The method 400 can include providing a mixture comprising a carbon precursor and silane-treated silicon particles, block 410. The method 400 can also include pyrolysing the precursor, e.g., to convert the precursor into one or more types of carbon phases, block 420.

With respect to block 410 of method 400, the silane-treated silicon particles can be added to a mixture comprising a carbon precursor. The silicon particles can be silane-treated using any embodiment described herein. In some such embodiments, as described herein, the carbon precursor can include a polymer and a solvent. The polymer and solvent can include any of the polymers and solvents described herein.

As described herein, the method 400 can also include various steps such as casting the mixture on a substrate, drying the mixture to form a film, removing the film from the substrate, and placing the film in a hot press. With respect to block 420 of method 400, the carbon precursor can be pyrolyzed as described herein to convert the precursor into one or more types of carbon phases. The silicon particles can be distributed throughout the composite material film.

As described herein, silane surface-treated silicon particles can have better wetting with polymeric binder solutions and a greater ability to adhere to polymeric materials. Advantageously, the adhesion is able to survive pyrolysis. In a silicon-carbon composite material, this can translate to less porosity, greater physical strength, and/or better cycling performance, e.g., in lithium-ion batteries. Without being bound by theory, the increased $SiO_2$ domain from multifunctional silyl ethers can produce an increased SiC domain which can provide additional structural integrity to various embodiments of silicon composites. In many instances, the addition of an interfacial layer between the silicon and carbon does not increase the electrical resistance and/or harm electrochemical performance. Additionally, the Si—O in silane can be reduced to form SiC which, per equation 1, can help in reducing Li loss to the SEI layer.

EXAMPLES

The below example processes for anode fabrication generally include mixing components together, casting those components onto a removable substrate, drying, curing, removing the substrate, then pyrolyzing the resulting samples. N-Methyl-2-pyrrolidone (NMP) was typically used as a solvent to modify the viscosity of any mixture and render it castable using a doctor blade approach.

Example 1

In Example 1, a polyimide liquid precursor (PI 2611 from HD Microsystems corp.), graphite particles (SLP30 from Timcal corp.), conductive carbon particles (Super P from Timcal corp.), and silicon particles (from Alfa Aesar corp.) were mixed together for 5 minutes using a Spex 8000D machine in the weight ratio of 200:55:5:20. The mixture was then cast onto aluminum foil and allowed to dry in a 90° C. oven, to drive away solvents, e.g., NMP. This is followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 15.8% of PI 2611 derived carbon, 57.9% of graphite particles, 5.3% of carbon resulting from Super P, and 21.1% of silicon by weight.

Figure 4:
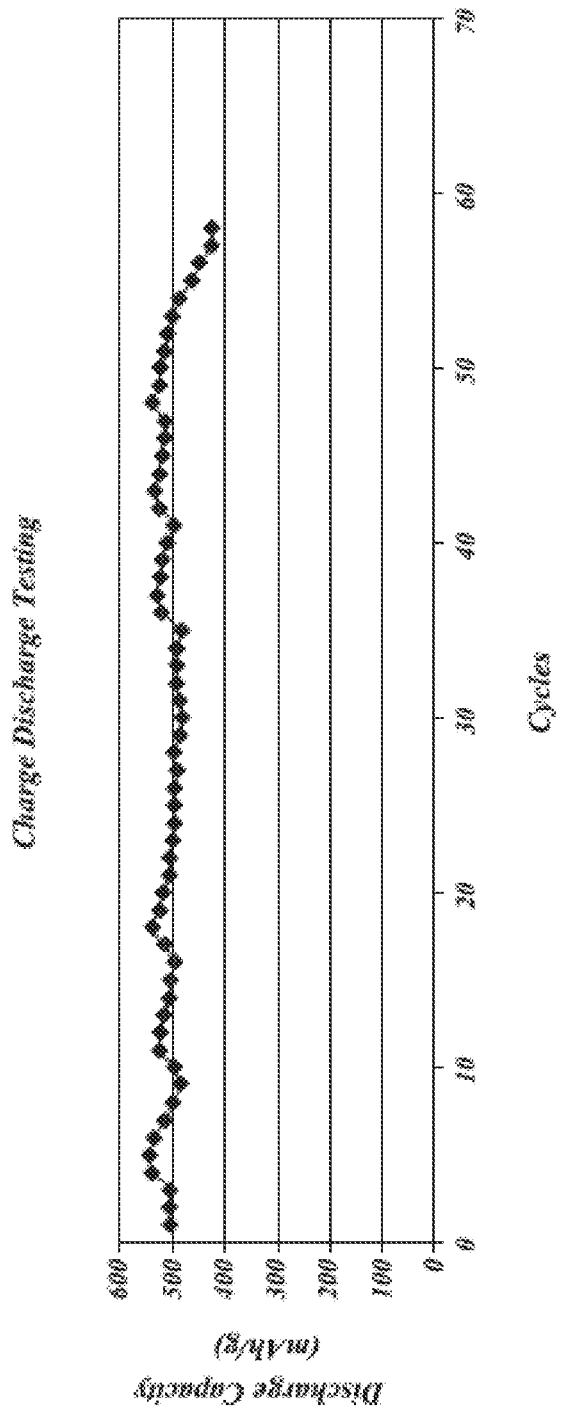
FIG. 4 is a plot of the discharge capacity at an average rate of C/2.6.

The resulting electrodes were then tested in a pouch cell configuration against a lithium NMC oxide cathode. A typical cycling graph is shown in FIG. 4.

Example 2

In Example 2, silicon particles (from EVNANO Advanced Chemical Materials Co. Ltd.) were initially mixed with NMP using a Turbula mixer for a duration of one hour at a 1:9 weight ratio. Polyimide liquid precursor (PI 2611 from HD Microsystems corp.), graphite particles (SLP30 from Timcal corp.), and carbon nanofibers (CNF from Pyrograf corp.) were then added to the Si:NMP mixture in the weight ratio of 200:55:5:200 and vortexed for around 2 minutes. The mixture was then cast onto aluminum foil that was covered by a 21 μm thick copper mesh. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1000° C. under argon. The process resulted in a composition of 15.8% of PI 2611 derived carbon, 57.9% of graphite particles, 5.3% of CNF, and 21.1% of silicon by weight.

Figure 5:
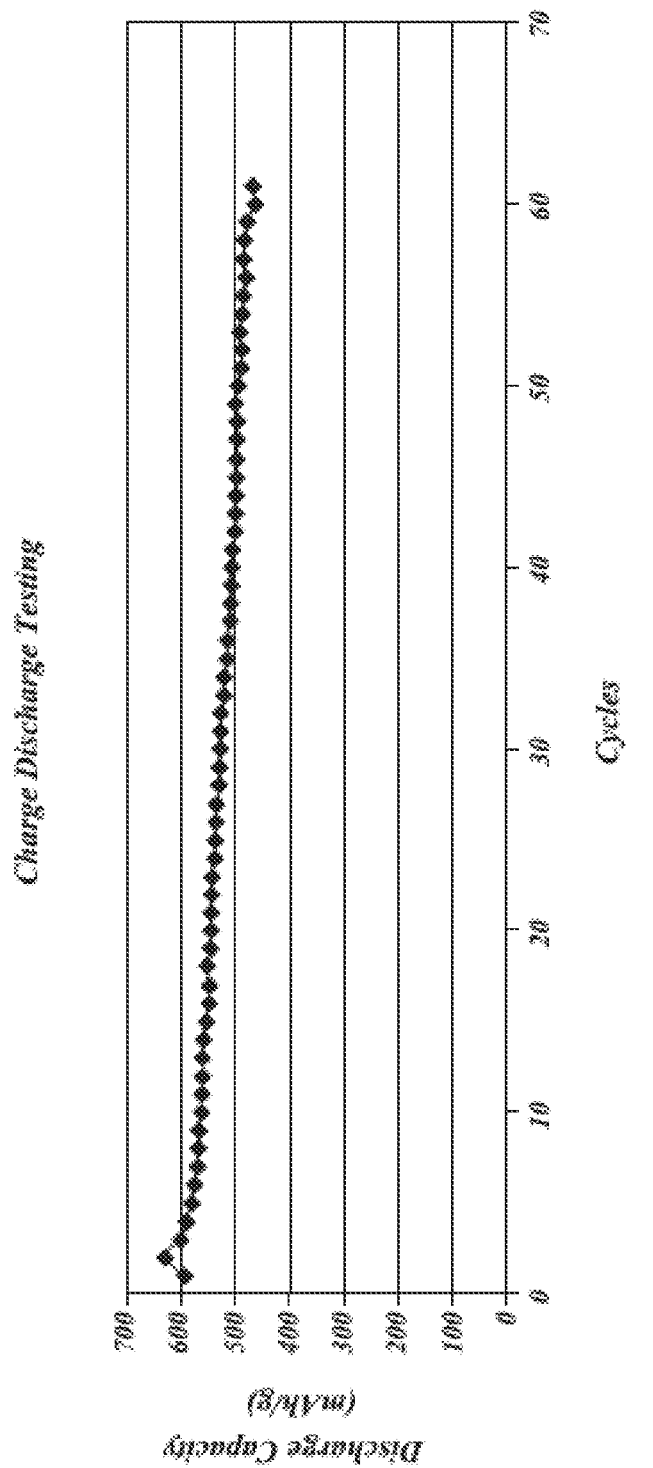
FIG. 5 is a plot of the discharge capacity at an average rate of C/3.

The resulting electrodes were then tested in a pouch cell configuration against a lithium NMC oxide cathode. A typical cycling graph is shown in FIG. 5.

Example 3

In Example 3, polyimide liquid precursor (PI 2611 from HD Microsystems corp.), and 325 mesh silicon particles (from Alfa Aesar corp.) were mixed together using a Turbula mixer for a duration of 1 hour in the weight ratios of 40:1. The mixture was then cast onto aluminum foil and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 75% of PI 2611 derived carbon and 25% of silicon by weight.

Figure 6:
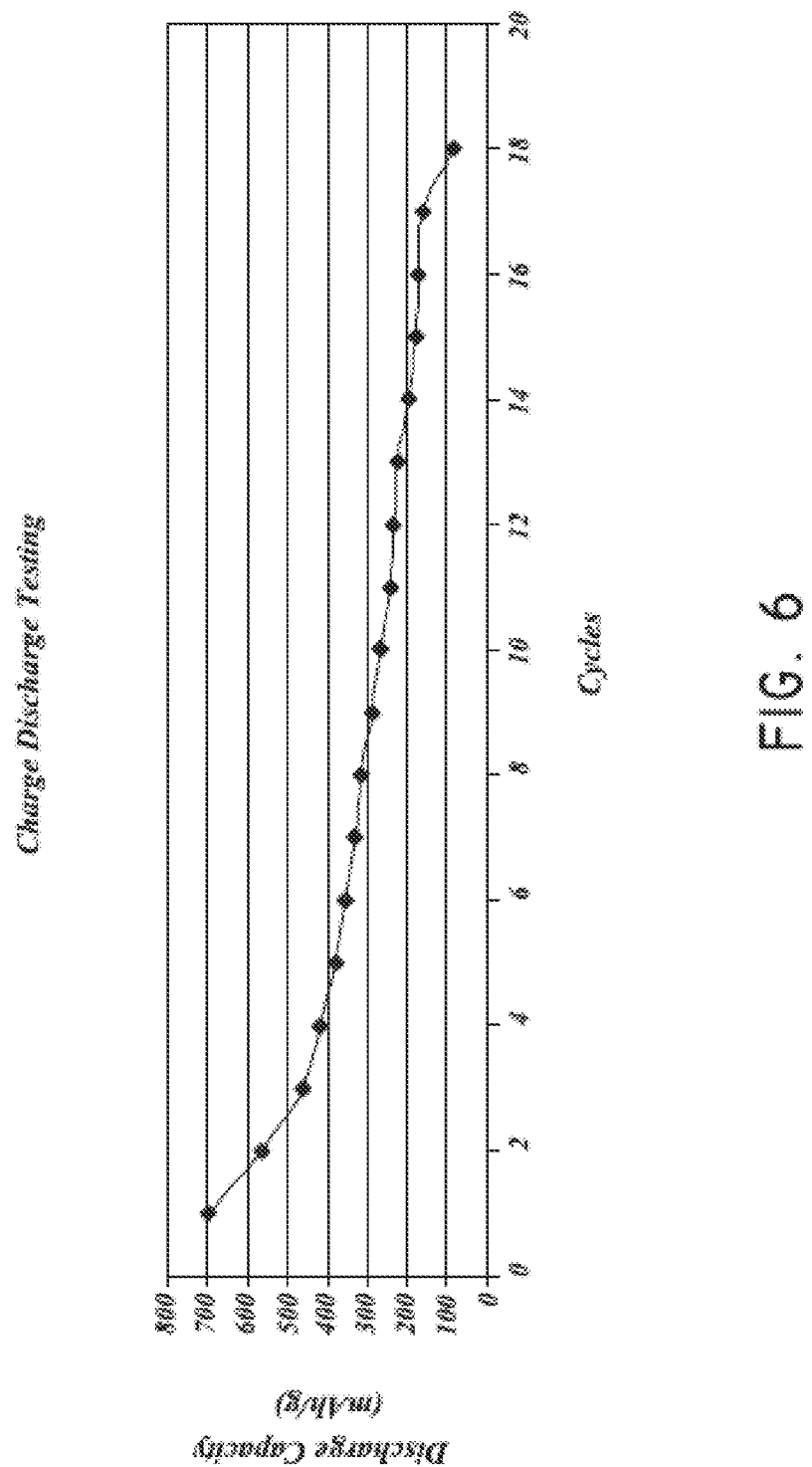
FIG. 6 is a plot of the discharge capacity at an average rate of C/3.3.

The resulting electrodes were then tested in a pouch cell configuration against a lithium NMC Oxide cathode. A typical cycling graph is shown in FIG. 6.

Example 4

In Example 4, silicon microparticles (from Alfa Aesar corp.), polyimide liquid precursor (PI 2611 from HD Microsystems corp.), graphite particles (SLP30 from Timcal corp.), milled carbon fibers (from Fibre Glast Developments corp.), carbon nanofibers (CNF from Pyrograf corp.), carbon nanotubes (from CNANO Technology Limited), conductive carbon particles (Super P from Timcal corp.), conductive graphite particles (KS6 from Timca corp.) were mixed in the weight ratio of 20:200:30:8:4:2:1:15 using a vortexer for 5 minutes. The mixture was then cast onto aluminum foil. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1175° C. under argon. The process resulted in a composition similar to the original mixture but with a PI 2611 derived carbon portion that was 7.5% the original weight of the polyimide precursor.

Figure 7:
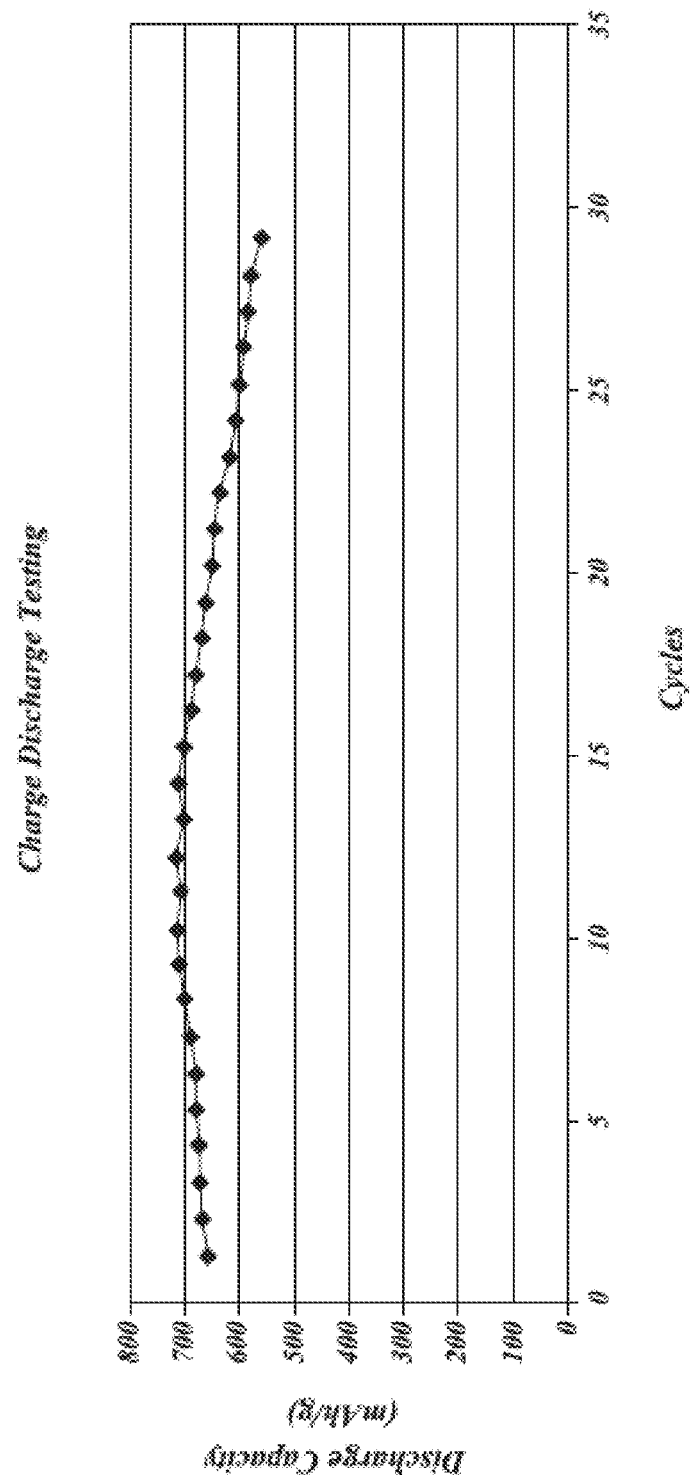
FIG. 7 is a plot of the discharge capacity at an average rate of C/5.

The resulting electrodes were then tested in a pouch cell configuration against a lithium NMC oxide cathode. A typical cycling graph is shown in FIG. 7.

Example 5

In Example 5, polyimide liquid precursor (PI 2611 from HD Microsystems corp.), and silicon microparticles (from Alfa Aesar corp.) were mixed together using a Turbula mixer for a duration of 1 hours in the weight ratio of 4:1. The mixture was then cast onto aluminum foil covered with a carbon veil (from Fibre Glast Developments Corporation) and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of approximately 23% of PI 2611 derived carbon, 76% of silicon by weight, and the weight of the veil being negligible.

Figure 8:
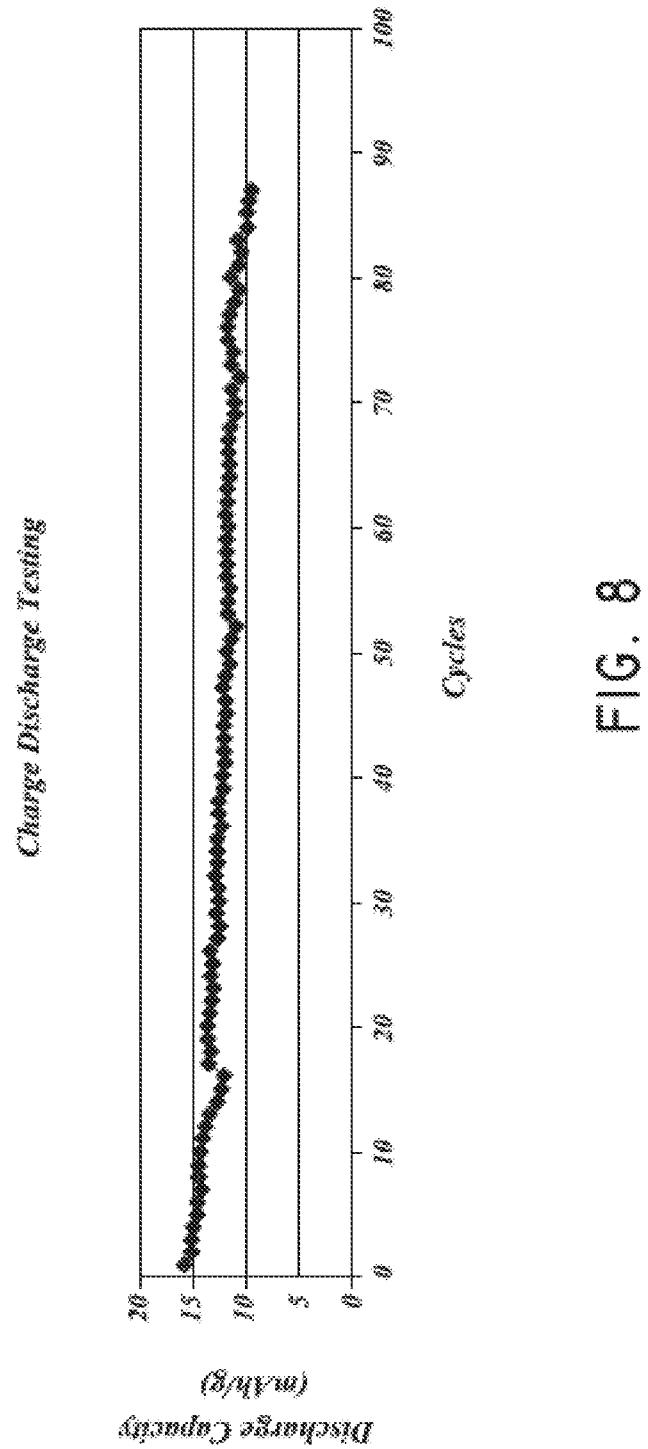
FIG. 8 is a plot of the discharge capacity at an average rate of C/9.

The resulting electrodes were then tested in a pouch cell configuration against a lithium nickel manganese cobalt oxide (NMC) cathode. A typical cycling graph is shown in FIG. 8.

Example 6

In Example 6, polyimide liquid precursor (PI 2611 from HD Microsystems corp.), graphite particles (SLP30 from Timcal corp.), and silicon microparticles (from Alfa Aesar corp.) were mixed together for 5 minutes using a Spex 8000D machine in the weight ratio of 200:10:70. The mixture was then cast onto aluminum foil and allowed to dry in a 90° C. oven, to drive away solvents (e.g., NMP). The dried mixture was cured at 200° C. in a hot press, under negligible pressure, for at least 12 hours. The aluminum foil backing was then removed by etching in a 12.5% HCl solution. The remaining film was then rinsed in DI water, dried and then pyrolyzed at 1175° C. for about one hour under argon flow. The process resulted in a composition of 15.8% of PI 2611 derived carbon, 10.5% of graphite particles, 73.7% of silicon by weight.

Figure 9:
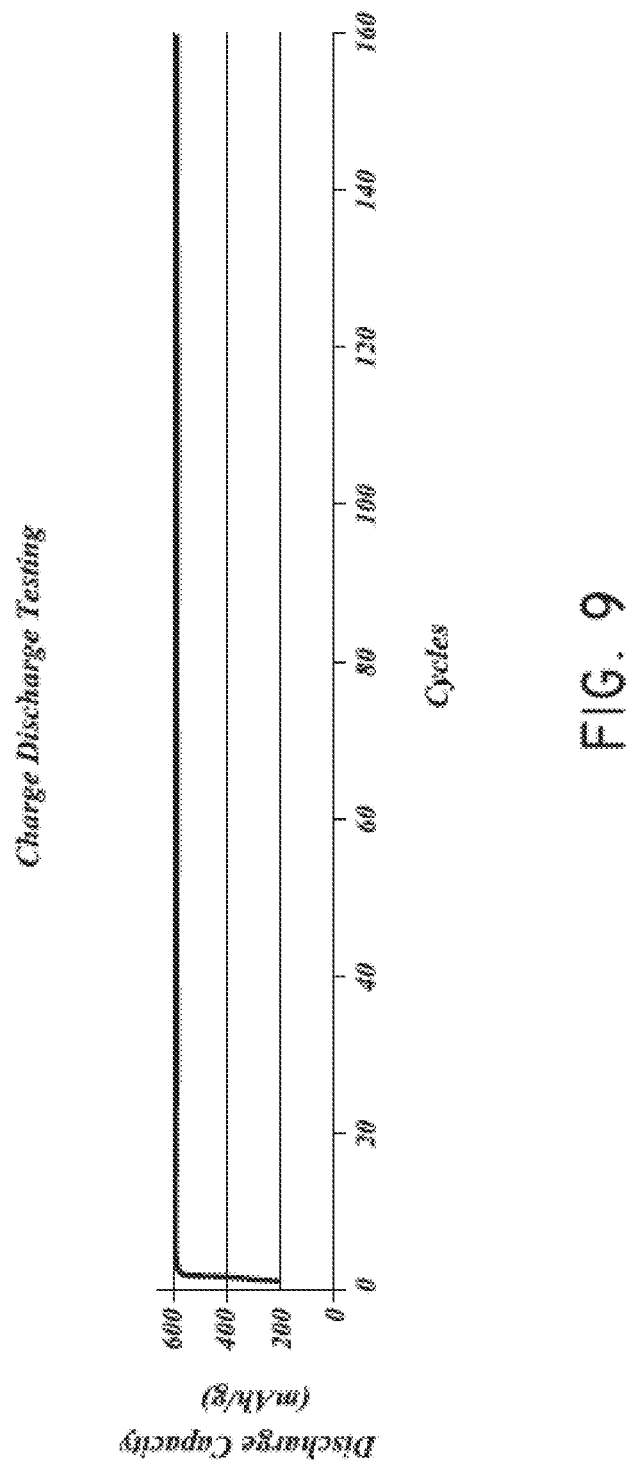
FIG. 9 is a plot of the discharge capacity.

The resulting electrodes were then tested in a pouch cell configuration against a lithium NMC oxide cathode. The anodes where charged to 600 mAh/g each cycle and the discharge capacity per cycle was recorded. A typical cycling graph is shown in FIG. 9.

Example 7

Figure 10:
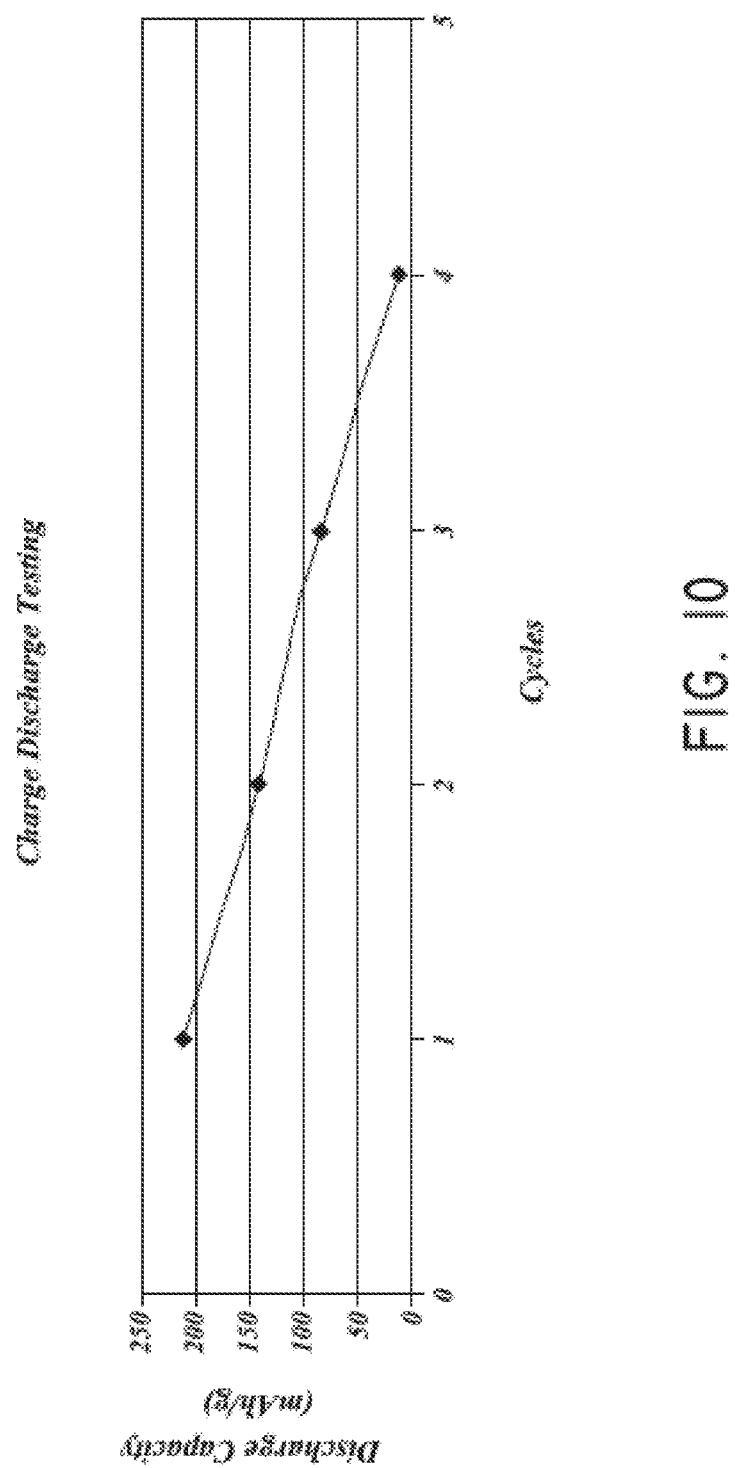
FIG. 10 is a plot of the discharge capacity at an average rate of C/9.

In Example 7, PVDF and silicon particles (from EVNANO Advanced Chemical Materials Co), conductive carbon particles (Super P from Timcal corp.), conductive graphite particles (KS6 from Timcal corp.), graphite particles (SLP30 from Timcal corp.) and NMP were mixed in the weight ratio of 5:20:1:4:70:95. The mixture was then cast on a copper substrate and then placed in a 90° C. oven to drive away solvents, e.g., NMP. The resulting electrodes were then tested in a pouch cell configuration against a lithium NMC Oxide cathode. A typical cycling graph is shown in FIG. 10.

Example 8

Multiple experiments were conducted in order to find the effects of varying the percentage of polyimide derive carbon (e.g. 2611c) while decreasing the percentage of graphite particles (SLP30 from Timcal corp.) and keeping the percentage of silicon microparticles (from Alfa Aesar corp.) at 20 wt. %.

Figure 11A:
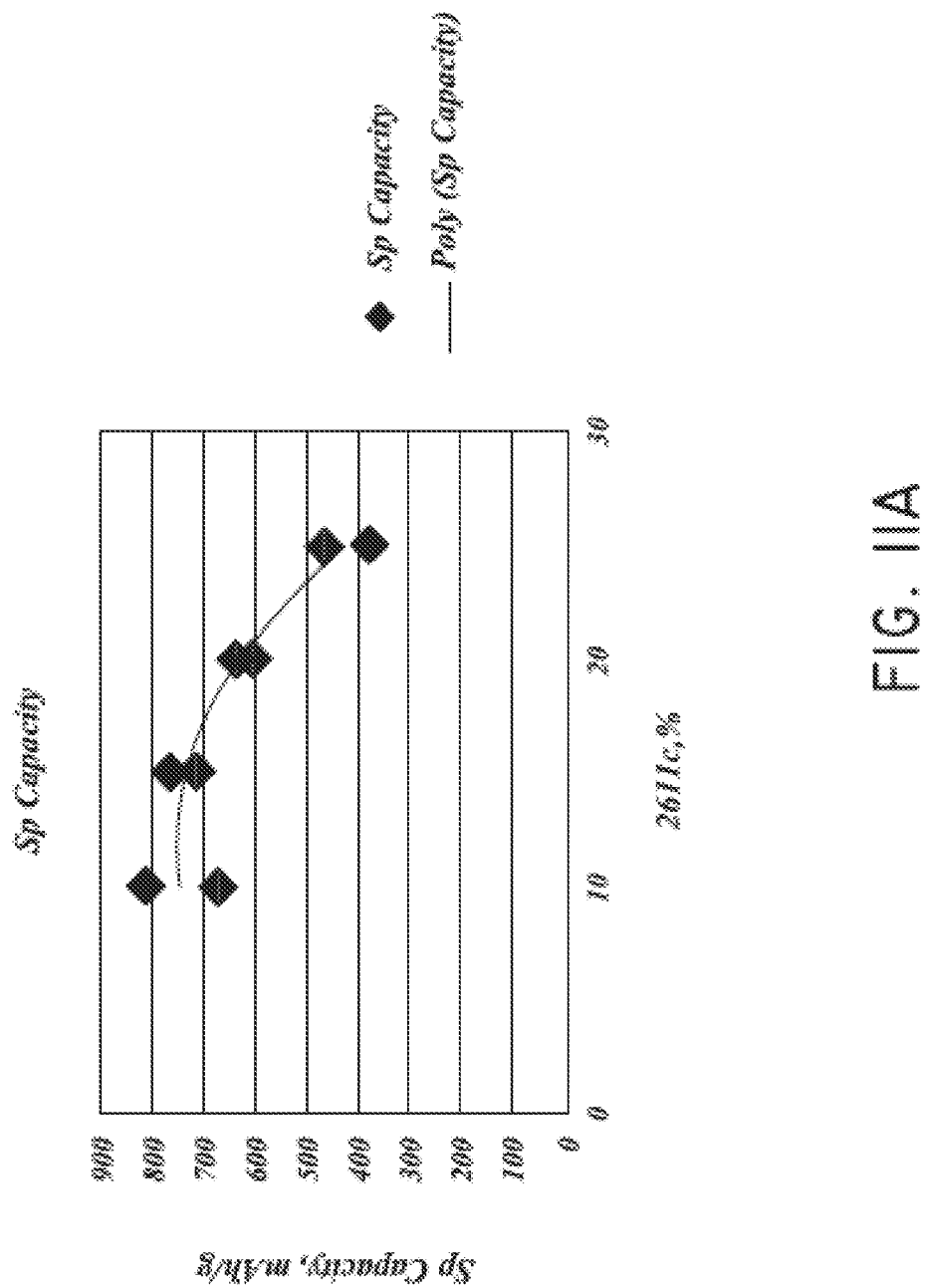
FIGS. 11A and 11B are plots of the reversible and irreversible capacity as a function of the various weight percentage of PI derived carbon from 2611c and graphite particles for a fixed percentage of 20 wt. % Si.
Figure 11B:
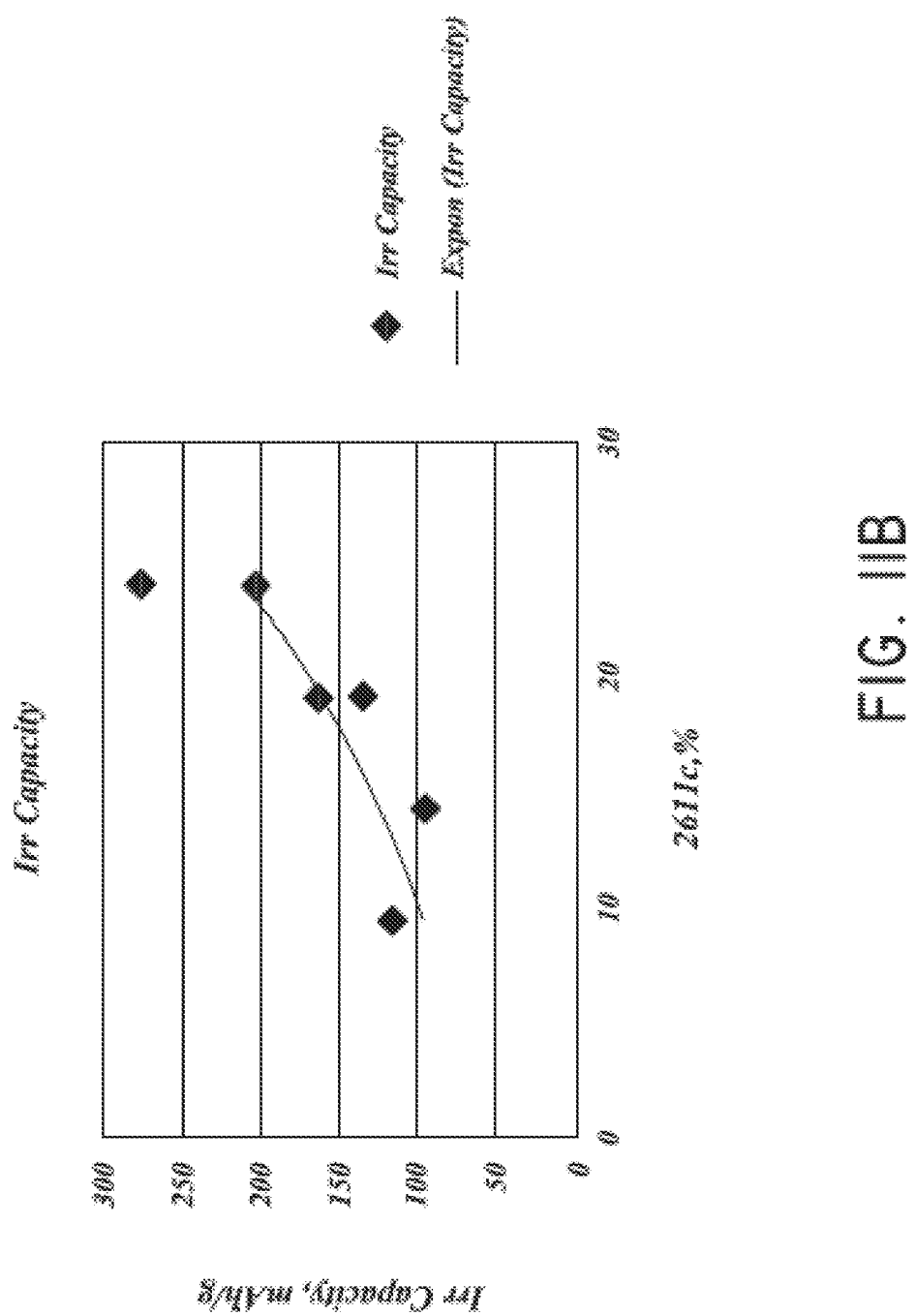

As shown in FIGS. 11A and 11B, the results show that more graphite and less 2611c was beneficial to cell performance by increasing the specific capacity while decreasing the irreversible capacity. Minimizing 2611c adversely affected the strength of the resultant anode so a value close to 20 wt. % can be preferable as a compromise in one embodiment.

Example 9

Figure 12:
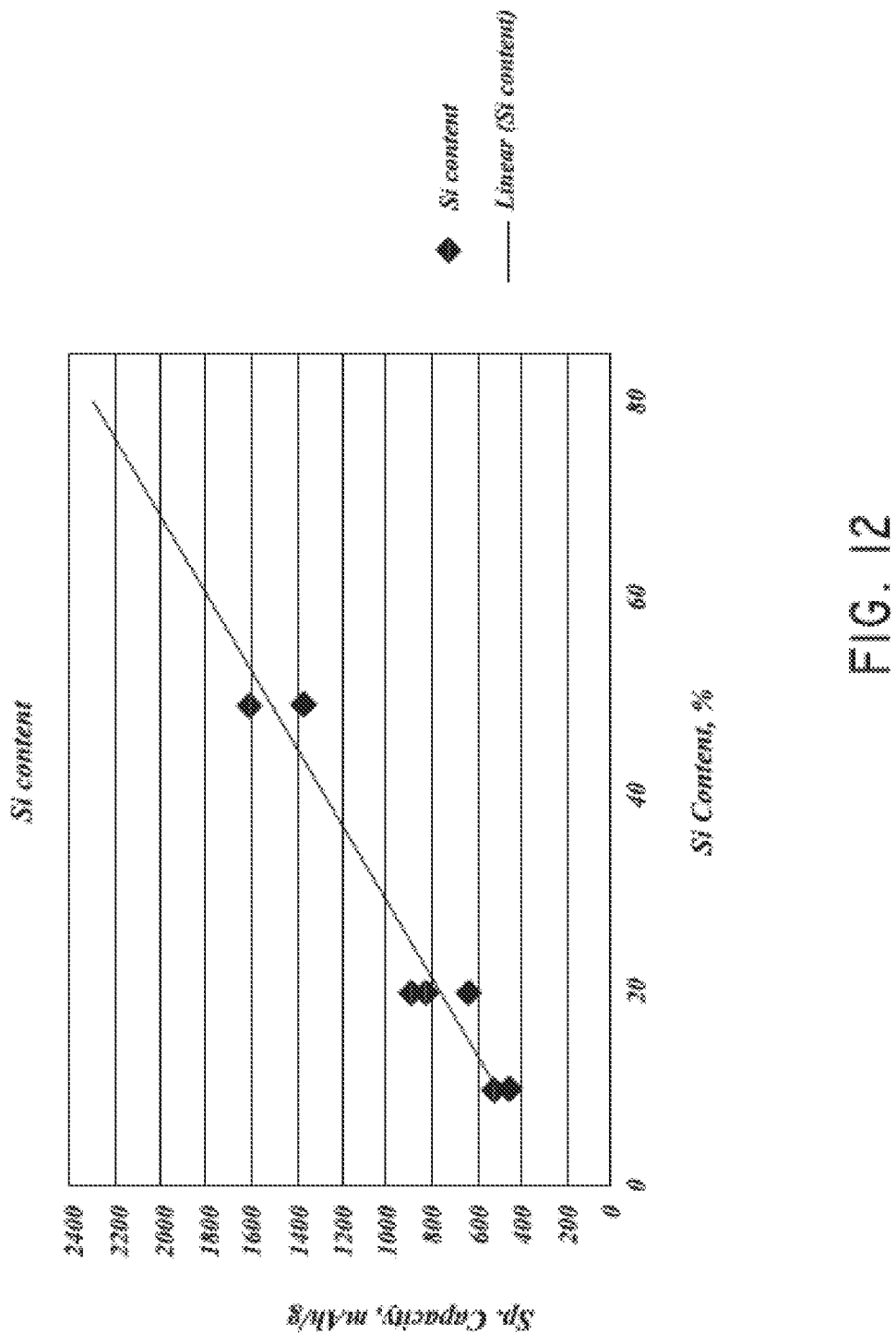
FIG. 12 is a plot of the first cycle discharge capacity as a function of weight percentage of carbon.

Similar to example 8, if 2611c is kept at 20 wt. % and Si percentage is increased at the expense of graphite particles, the first cycle discharge capacity of the resulting electrode is increased. FIG. 12 shows that a higher silicon content can make a better performing anode.

Example 10

Figure 13:
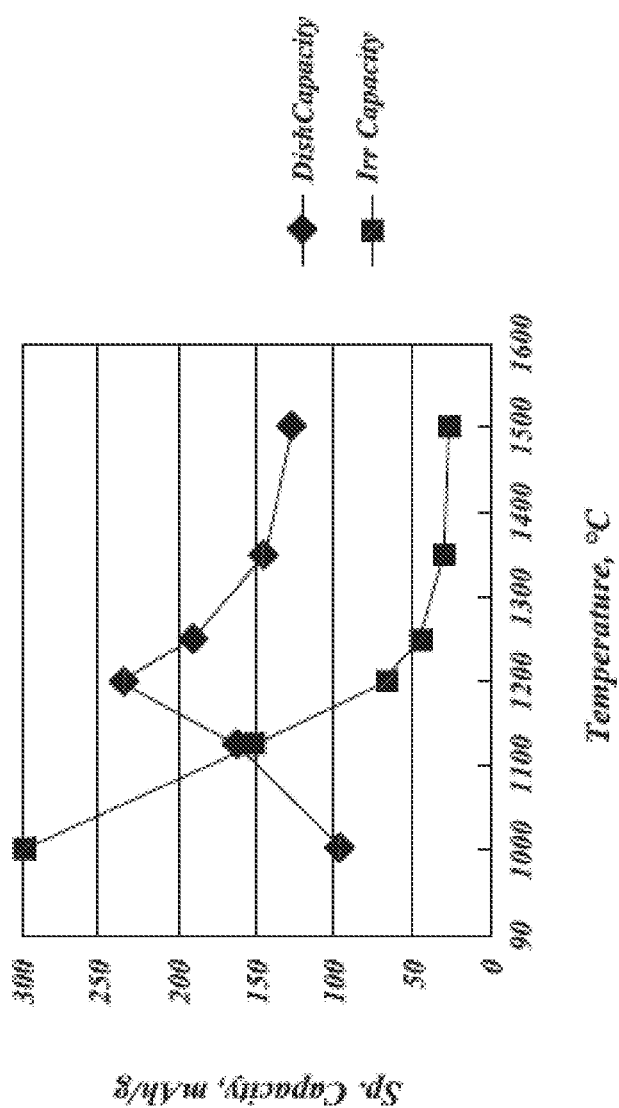
FIG. 13 is a plot of the reversible (discharge) and irreversible capacity as a function of pyrolysis temperature.

When 1 mil thick sheets of polyimide are pyrolized and tested in accordance with the procedure in Example 1. The reversible capacity and irreversible capacity were plotted as a function of the pyrolysis temperature. FIG. 13 indicates that, in one embodiment, it is preferable to pyrolyze polyimide sheets (Upilex by UBE corp.) at around 1175° C.

ADDITIONAL EXAMPLES

Figure 14:
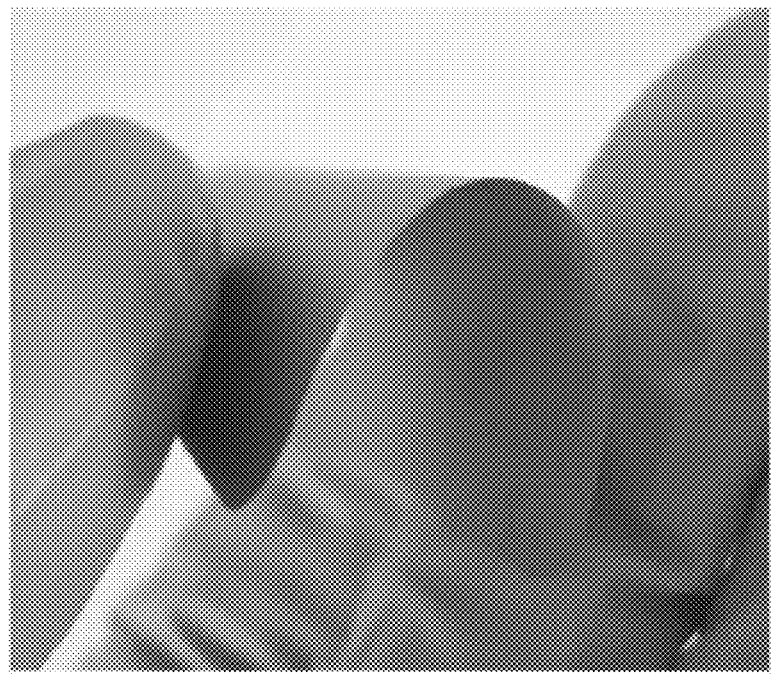
FIG. 14 is a photograph of a 4.3 cm×4.3 cm composite anode film without a metal foil support layer.

FIG. 14 is a photograph of a 4.3 cm×4.3 cm composite anode film without a metal foil support layer. The composite anode film has a thickness of about 30 microns and has a composition of about 15.8% of PI 2611 derived carbon, about 10.5% of graphite particles, and about 73.7% of silicon by weight.

Figure 15:
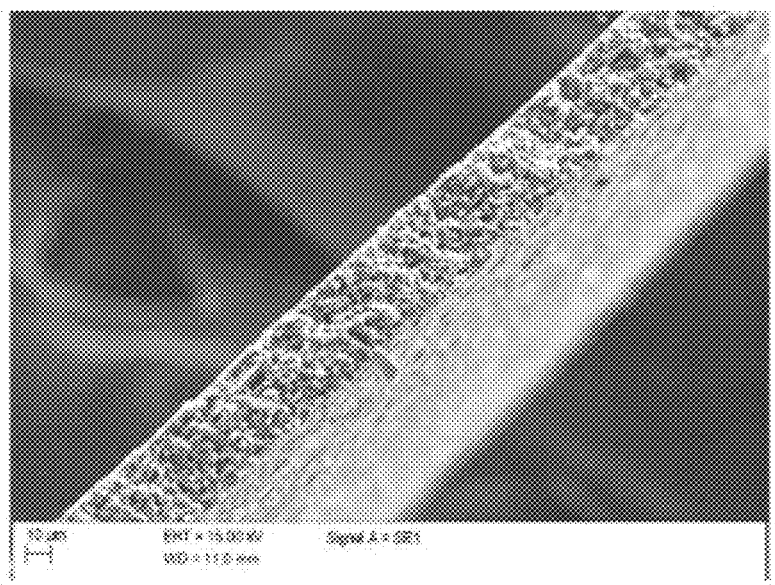
FIG. 15 is a scanning electron microscope (SEM) micrograph of a composite anode film before being cycled (the out-of-focus portion is a bottom portion of the anode and the portion that is in focus is a cleaved edge of the composite film)
Figure 16:
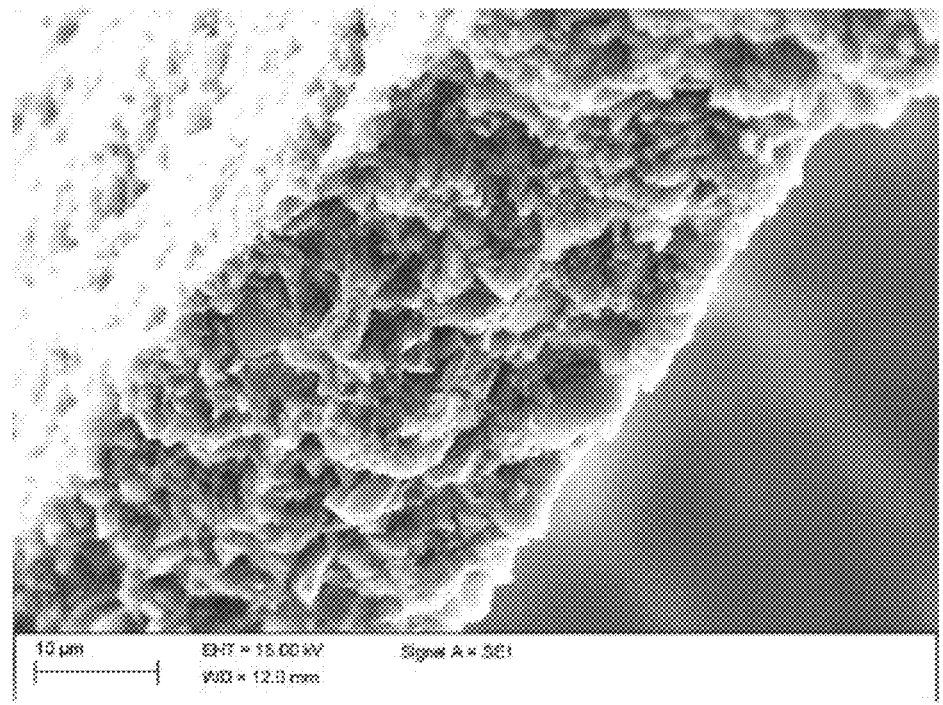
FIG. 16 is another SEM micrograph of a composite anode film before being cycled.
Figure 17:
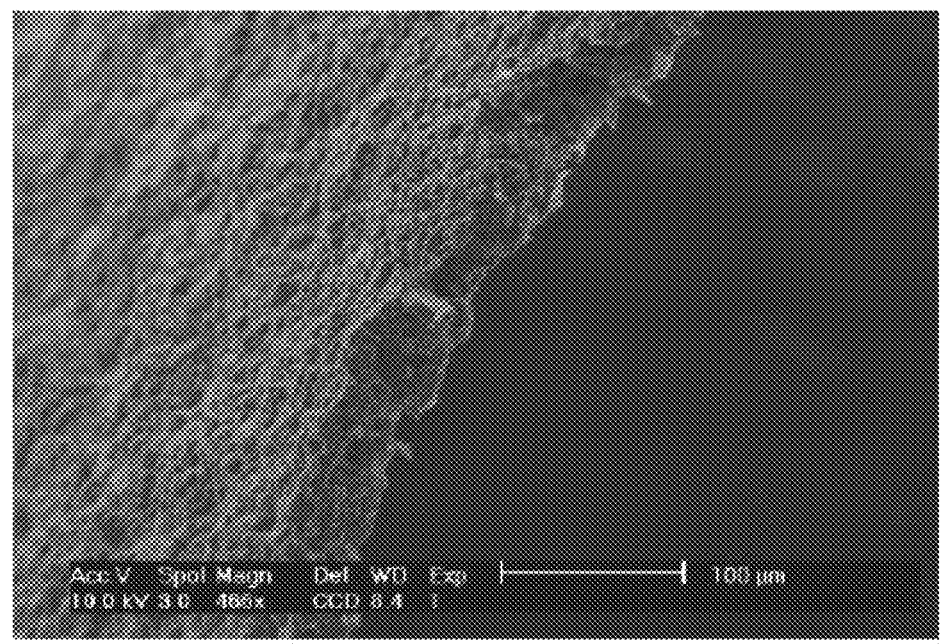
FIG. 17 is a SEM micrograph of a composite anode film after being cycled 10 cycles.
Figure 18:
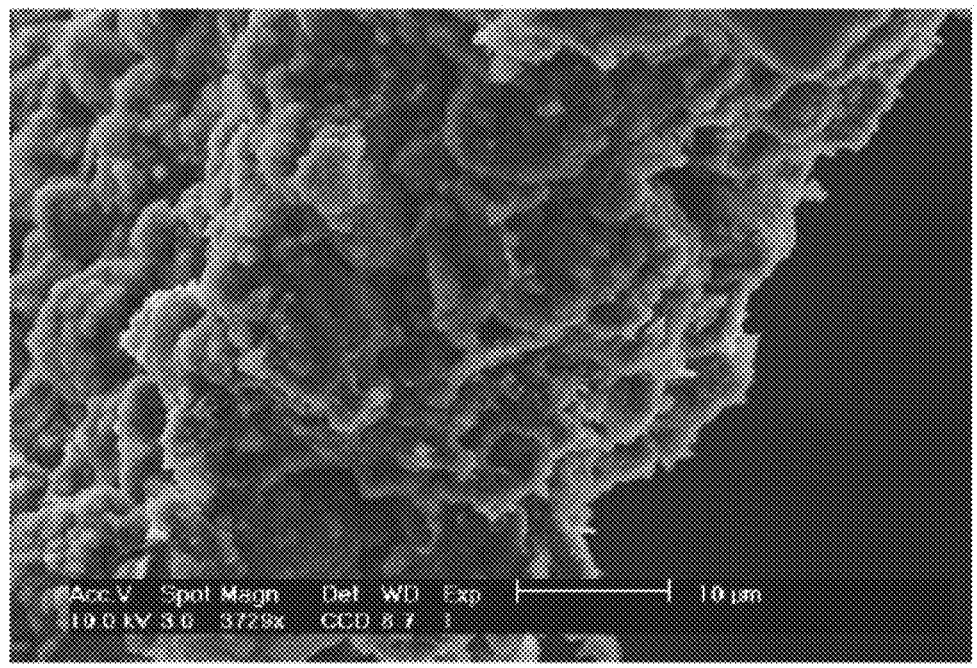
FIG. 18 is another SEM micrograph of a composite anode film after being cycled 10 cycles.
Figure 19:
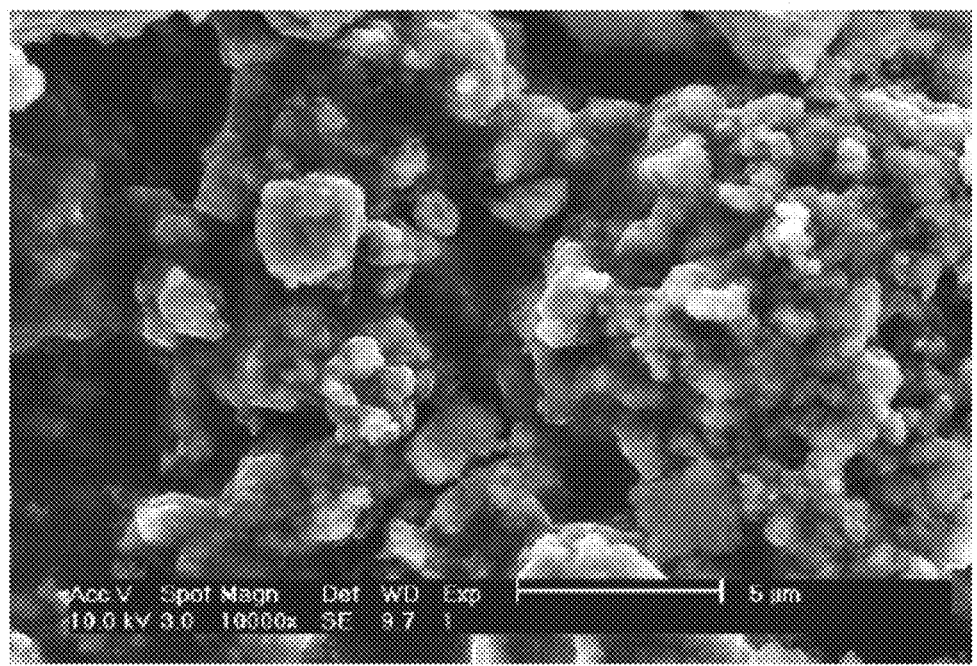
FIG. 19 is a SEM micrograph of a composite anode film after being cycled 300 cycles.
Figure 20:
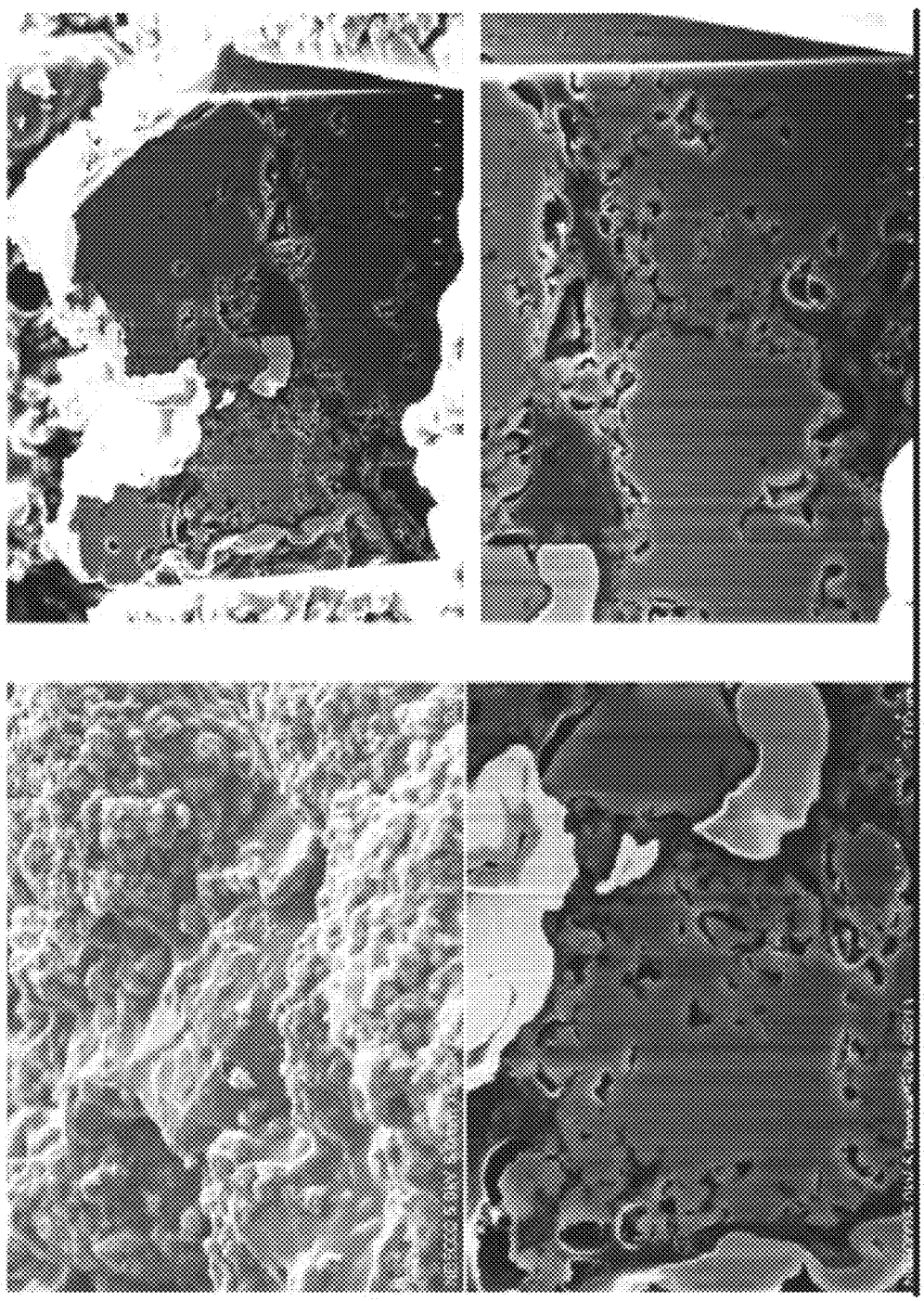
FIG. 20 includes SEM micrographs of cross-sections of composite anode films.

FIGS. 15-20 are scanning electron microscope (SEM) micrographs of a composite anode film. The compositions of the composite anode film were about 15.8% of PI 2611 derived carbon, about 10.5% of graphite particles, and about 73.7% of silicon by weight. FIGS. 15 and 16 show before being cycled (the out-of-focus portion is a bottom portion of the anode and the portion that is in focus is a cleaved edge of the composite film). FIGS. 17, 18, and 19 are SEM micrographs of a composite anode film after being cycled 10 cycles, 10 cycles, and 300 cycles, respectively. The SEM micrographs show that there is not any significant pulverization of the silicon and that the anodes do not have an excessive layer of solid electrolyte interface/interphase (SEI) built on top of them after cycling. FIG. 20 are SEM micrographs of cross-sections of composite anode films.

Described below are measured properties of example silicon particles. These examples are discussed for illustrative purposes and should not be construed to limit the scope of the disclosed embodiments.

Figure 21:
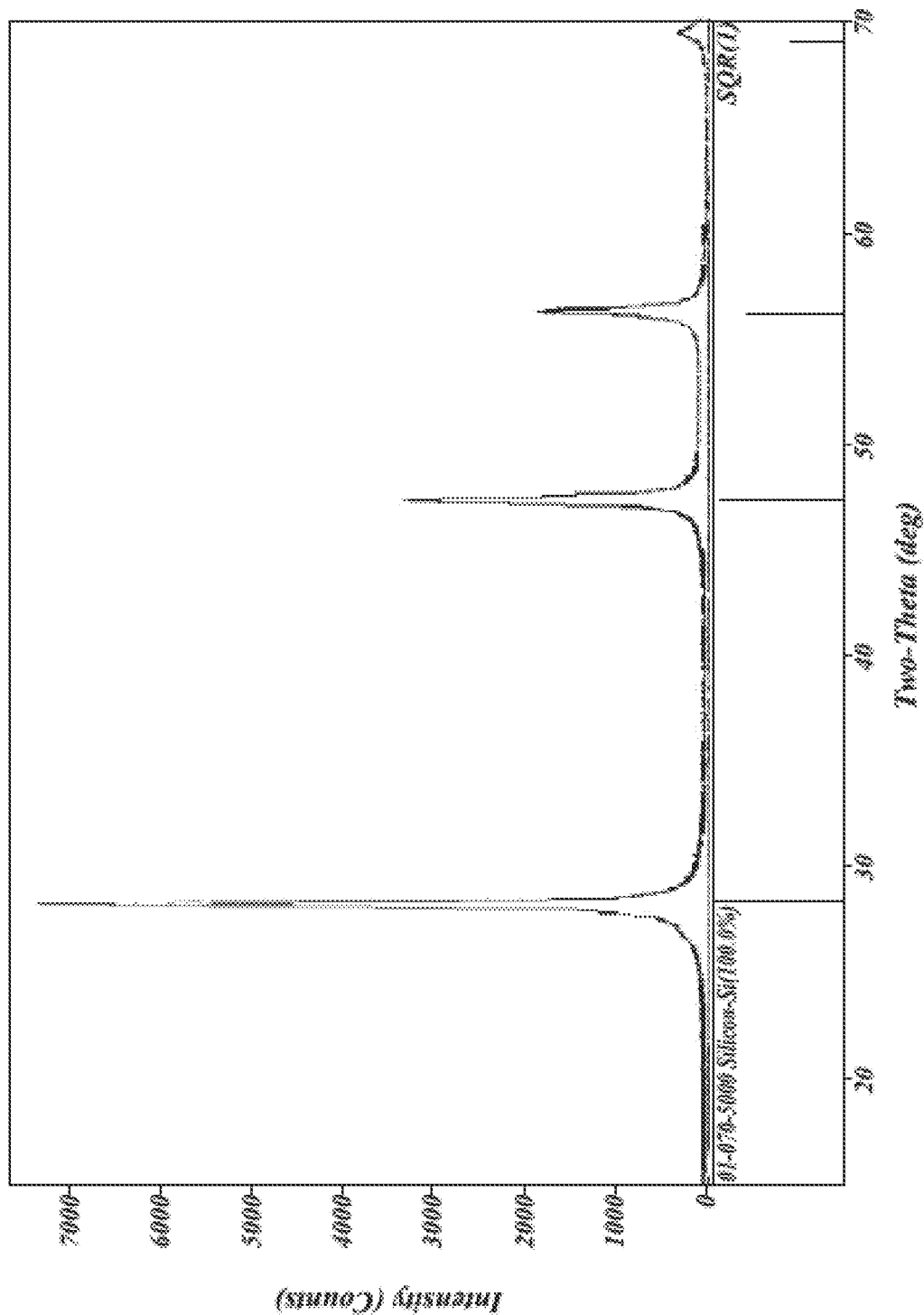
FIG. 21 is an x-ray powder diffraction (XRD) graph of the sample silicon particles.
Figure 22:
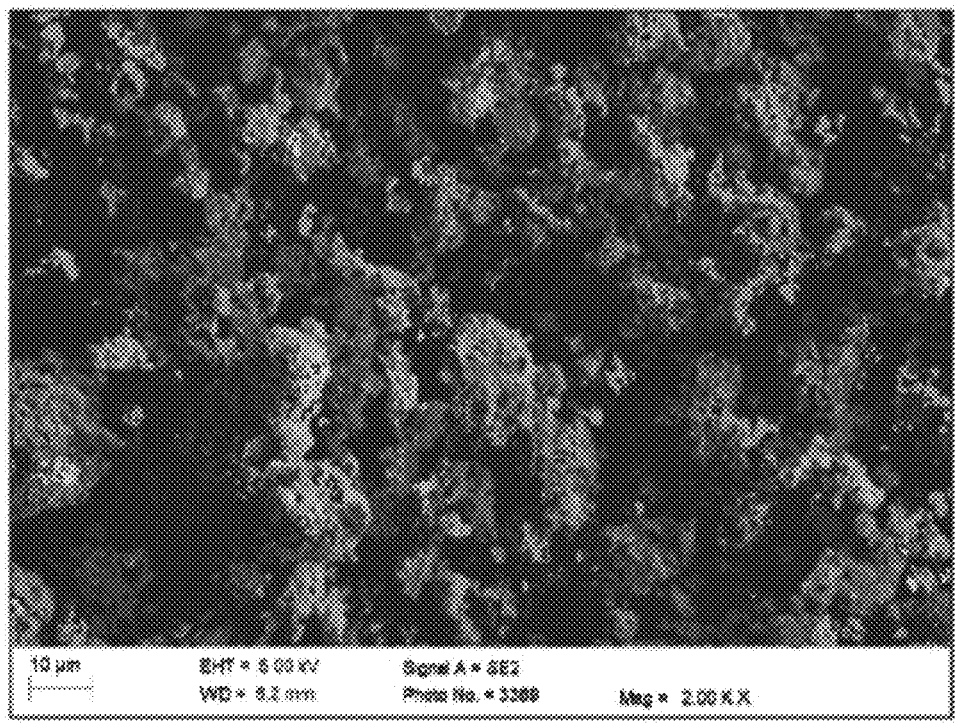
FIG. 22 is a SEM micrograph of one embodiment of silicon particles.
Figure 23:
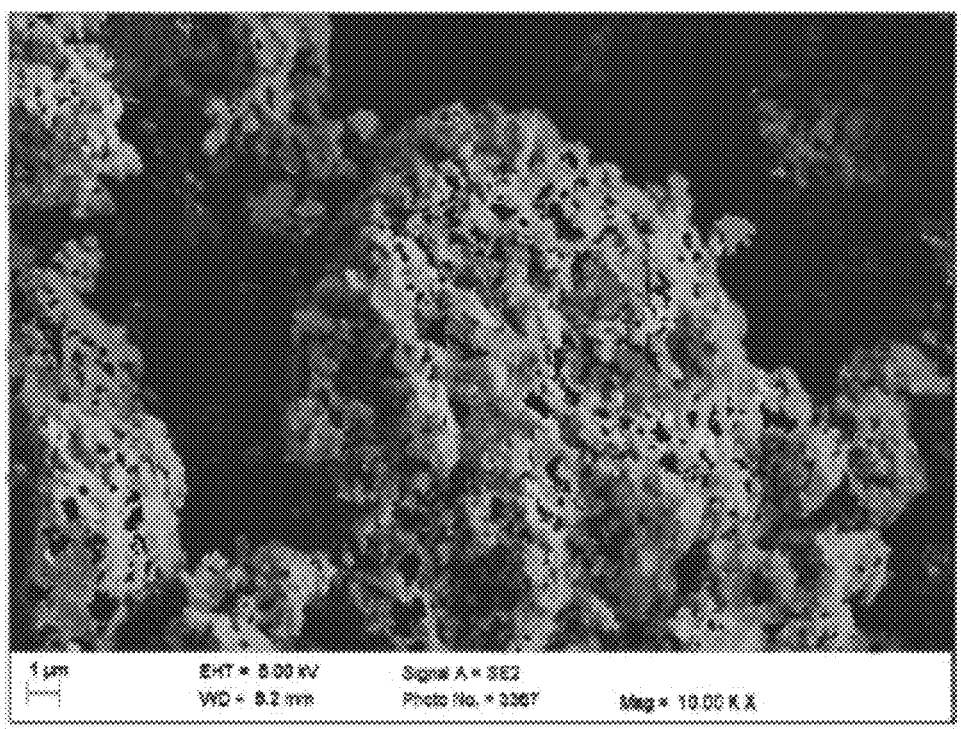
FIG. 23 is another SEM micrographs of one embodiment of silicon particles.
Figure 24:
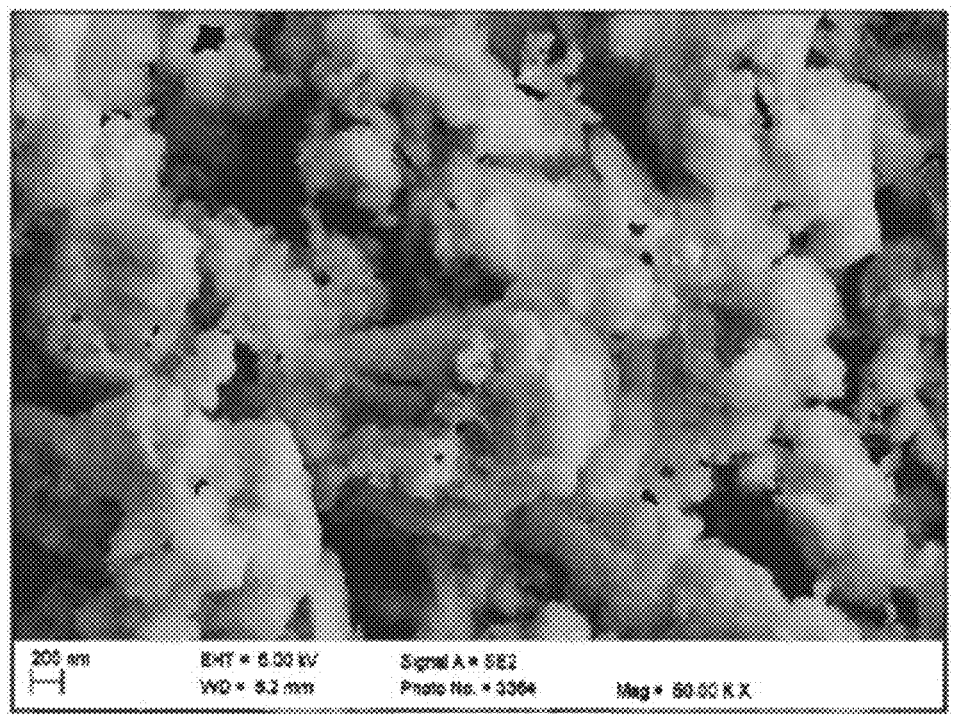
FIG. 24 is a SEM micrograph of one embodiment of silicon particles.
Figure 25:
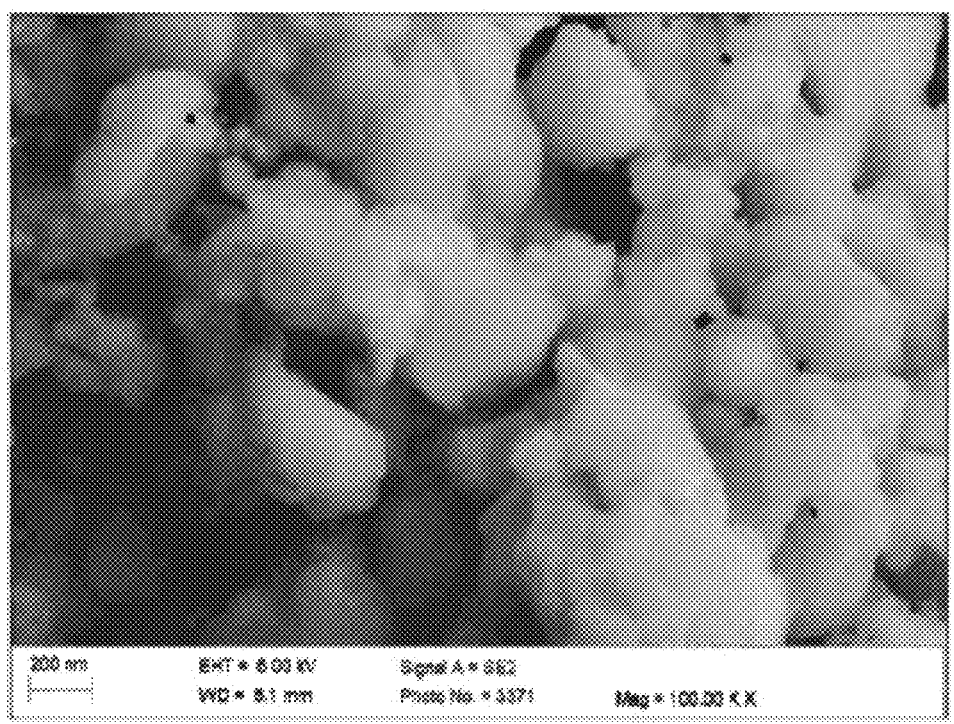
FIG. 25 is a SEM micrograph of one embodiment of silicon particles.

FIG. 21 is an x-ray powder diffraction (XRD) graph of the sample silicon particles. The XRD graph suggests that the sample silicon particles were substantially crystalline or polycrystalline in nature.

FIGS. 22-25 are scanning electron microscope (SEM) micrographs of the sample silicon particles. Although the SEM micrographs appear to show that the silicon particles may have an average particle size greater than the measured average particle size of about 300 nm, without being bound by theory, the particles are believed to have conglomerated together to appear to be larger particles.

FIG. 26 is a chemical analysis of the sample silicon particles. The chemical analysis suggests that the silicon particles were substantially pure silicon.

Figure 27A:
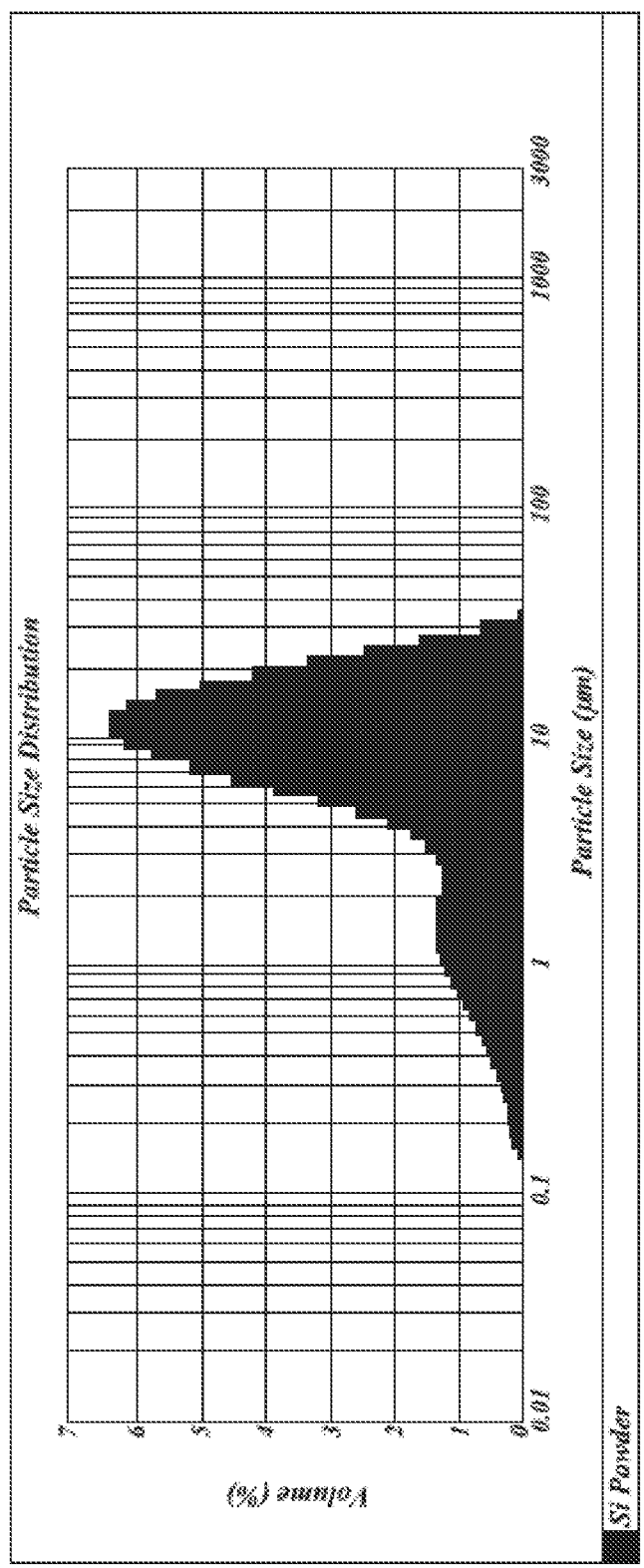
FIGS. 27A and 27B are example particle size histograms of two micron-sized silicon particles with nanometer-sized features.
Figure 27B:
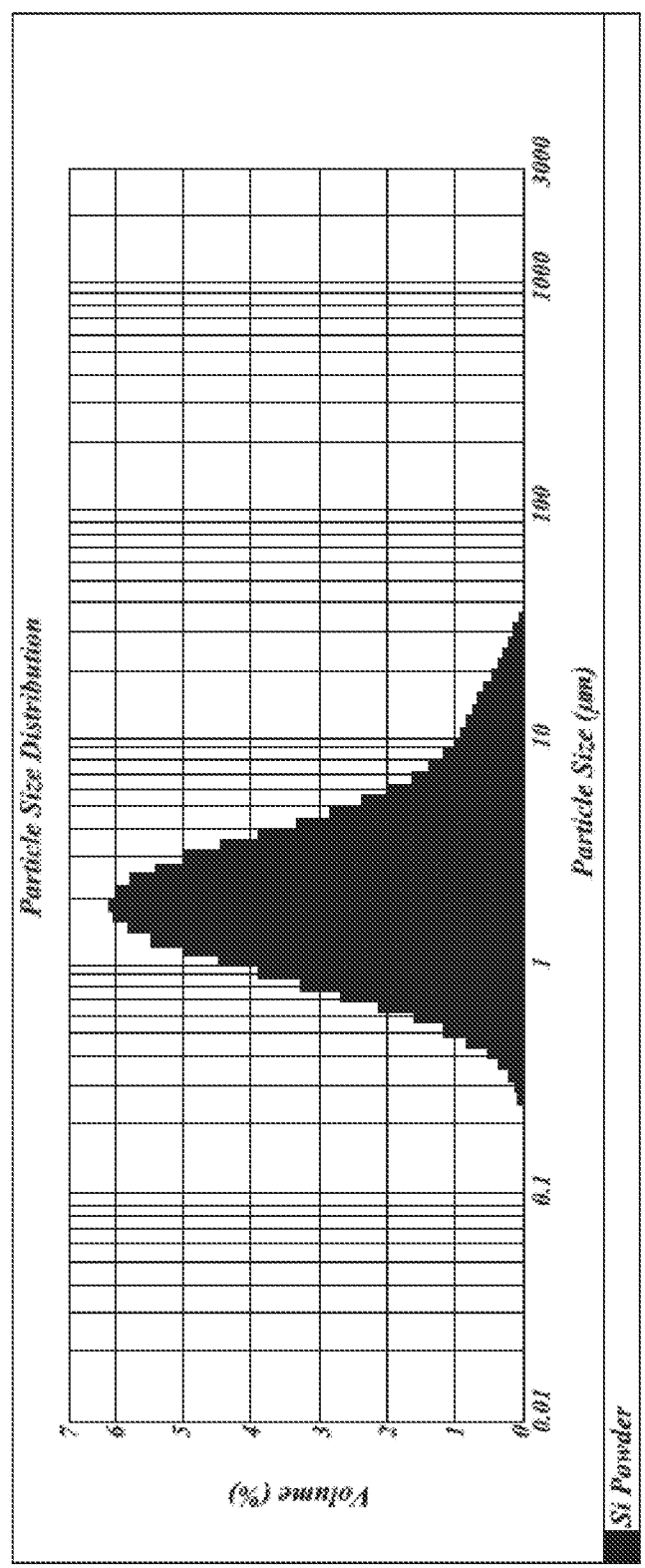

FIGS. 27A and 27B are example particle size histograms of two micron-sized silicon particles with nanometer-sized features. The particles were prepared from a FBR process. Example silicon particles can have a particle size distribution. For example, at least 90% of the particles may have a particle size, for example, a diameter or a largest dimension, between about 5 μm and about 20 μm (e.g., between about 6 μm and about 19 μm). At least about 50% of the particles may have a particle size between about 1 μm and about 10 μm (e.g., about 2 μm and about 9 μm). Furthermore, at least about 10% of the particles may have a particle size between about 0.5 μm and about 2 μm (e.g., about 0.9 μm and about 1.1 μm).

Figure 28:
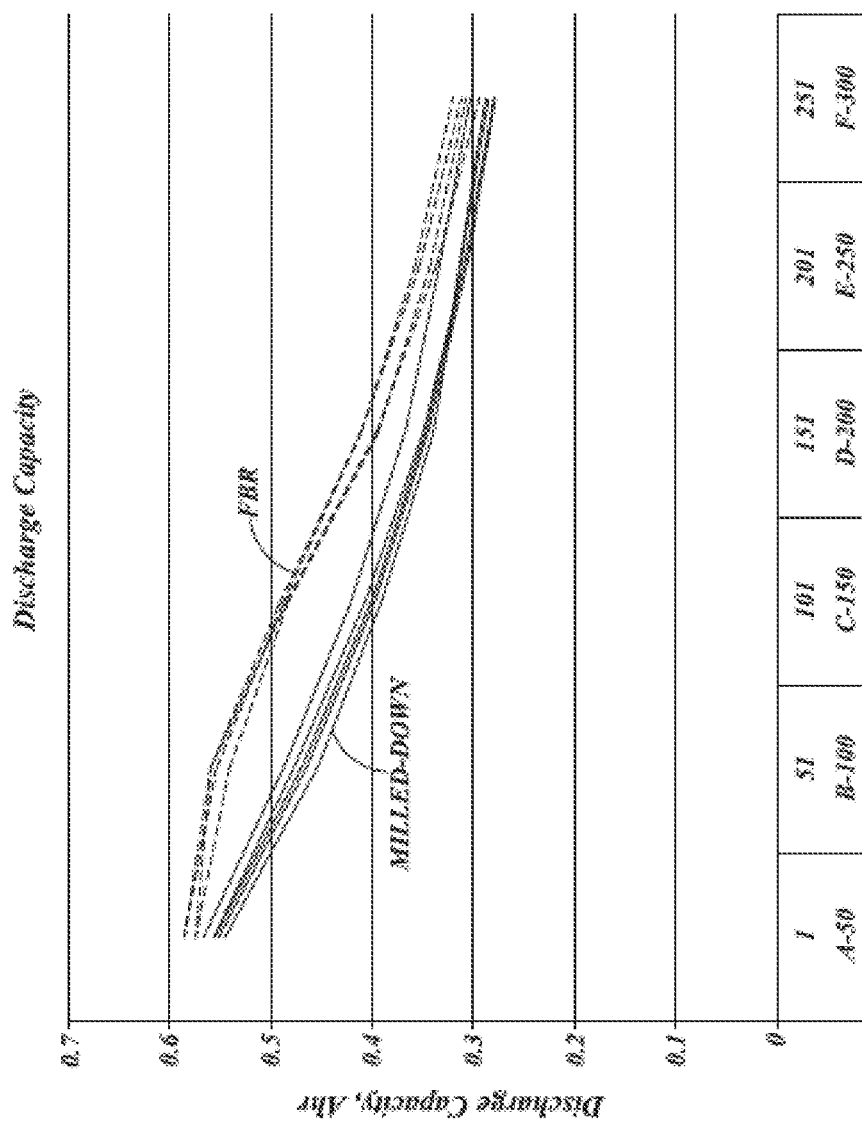
FIG. 28 is a plot of discharge capacity during cell cycling comparing two types of example silicon particles.

FIG. 28 is a plot of discharge capacity during cell cycling comparing two types of example silicon particles. The performance of four samples of silicon particles (micron-sized particles with nanometer-sized features) prepared by the FBR process are compared with five samples of silicon particles prepared by milling-down larger silicon particles. Thus, certain embodiments of silicon particles with the combined micron/nanometer geometry (e.g., prepared by the FBR process) can have enhanced performance over various other embodiments of silicon particles (e.g., micron-sized silicon particles prepared by milling down from larger particles). The type of silicon particles to use can be tailored for the intended or desired application and specifications.

Examples of Silane-Treated Silicon Particles

In one example, 50 g of silicon powder were added to a 1% solution of 3-aminopropyltriethoxysilane in water. The mixture was agitated and allowed to react for 5 minutes at room temperature. The treated silicon was then filtered out using filter paper and a Buchner funnel, rinsed with water, and dried under vacuum for 66 hours. The resulting material was mixed into a slurry with polyamic acid resin, graphite, and N-methyl-pyrrolidone (NMP), and coated onto a polyethylene terephthalate (PET) substrate. The resulting "green" silicon-composite film was removed from the PET, evaluated, and found to have 60% higher tensile strength than a film made the same way using untreated silicon.

In another example, silicon was added to a 2% solution of N-(2-aminoethyl)-3-aminopropyltrimethoxysilane in water, refluxed at 100° C. for 2 hours, and dried at 200° C. for 16 h. The resulting cake was pulverized and analyzed with X-ray Photoelectron Spectroscopy (XPS) to confirm the surface had been modified with the organosilane.

In another example, silicon was placed in a glass vessel and combined with N-(2-aminoethyl)-3-aminopropyltrimethoxysilane, with a component ratio of 0.4% organosilane to silicon by weight. The materials were agitated at 90° C. for 4 hours under atmospheric pressure. This produced a loosely agglomerated powder.

Figure 29:
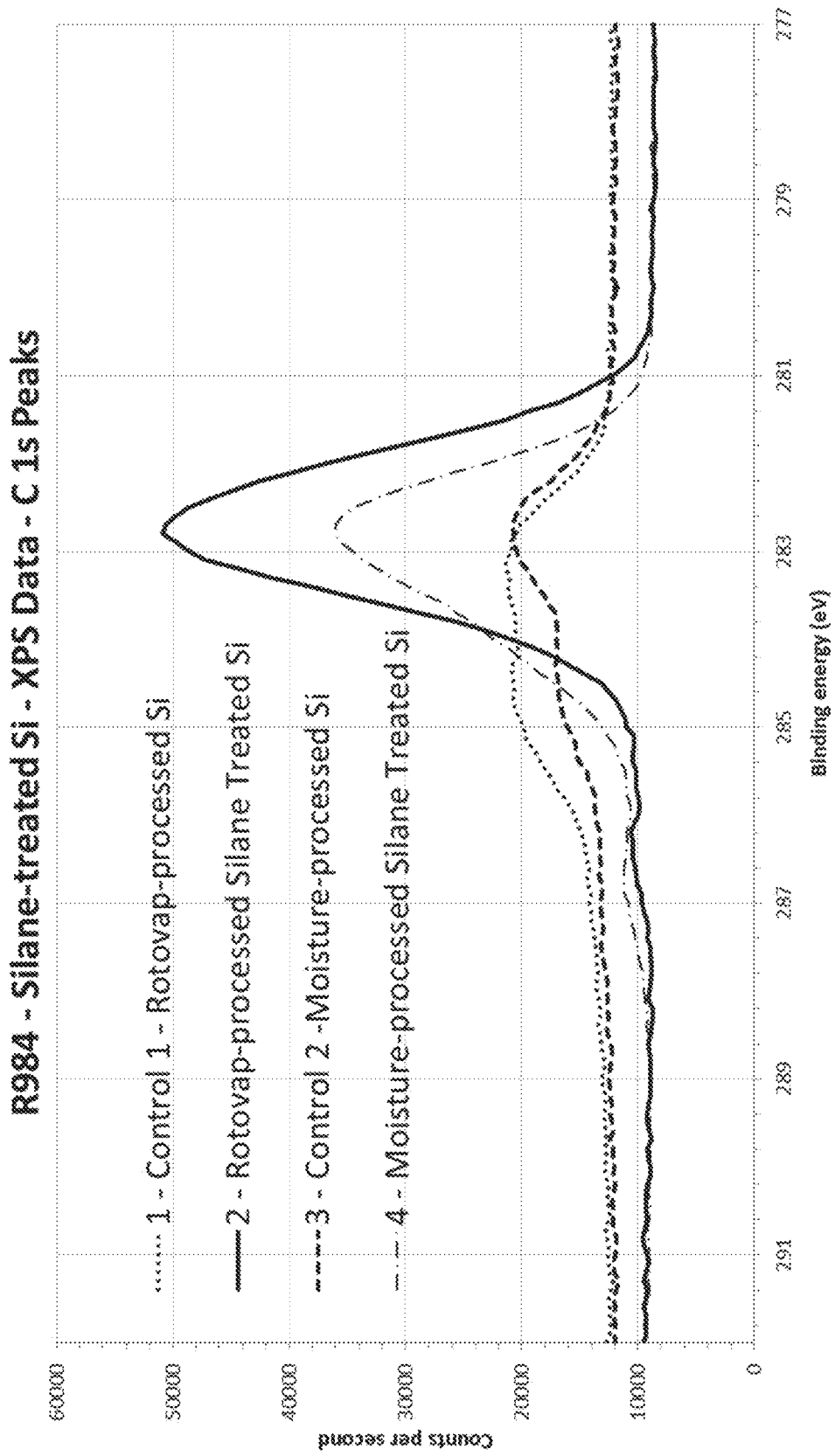
FIG. 29 shows X-ray Photoelectron Spectroscopy (XPS) spectra of example silane-treated and untreated silicon particles.

FIG. 29 shows a region of the X-ray Photoelectron Spectroscopy (XPS) spectra of the silane-treated and untreated silicon samples. The spectra for the examples treated in water (with and without silane) are shown as "Moisture-processed," and the spectra for the examples placed in a glass vessel under atmospheric pressure (with and without silane) are shown as "Rotovap-processed." The spectra show increased carbon content for the silane-treated silicon. In FIG. 29, the rotovap-processed silane-treated silicon has a higher peak than the moisture-processed silane-treated silicon. Without being bound by theory, the rotovap-process was done in a closed vessel at 90° C. where the silane vapors do not escape, thereby increasing the probability of reaction with the silicon.

The silane-treated silicon (moisture-processed and rotovap-processed) was milled in NMP with zirconia media, and mixed into a slurry containing NMP, graphite, and polyamic acid resin. The slurry was then coated onto a PET film at a loading of 4.27 mg/cm2 (with 15% solvent content), and densified using a calender. The green film was then removed from the PET, cut into sheets, and vacuum dried using a two-stage process (120° C. for 15 h, 220° C. for 5 h). The dry film was thermally treated at 1175° C. to convert the polymer matrix into carbon. Separately, a 15 µm thick copper foil was coated with polyamide-imide (applied as a 6 wt % varnish in NMP, dried 16 h at 110° C. under vacuum). The silicon-carbon composite film was laminated to the coated copper using a heated hydraulic press (50 seconds, 300° C., 4000 psi), forming the finished silicon-composite electrode. The silicon-carbon composite electrodes were inspected and analyzed.

Figure 30B:
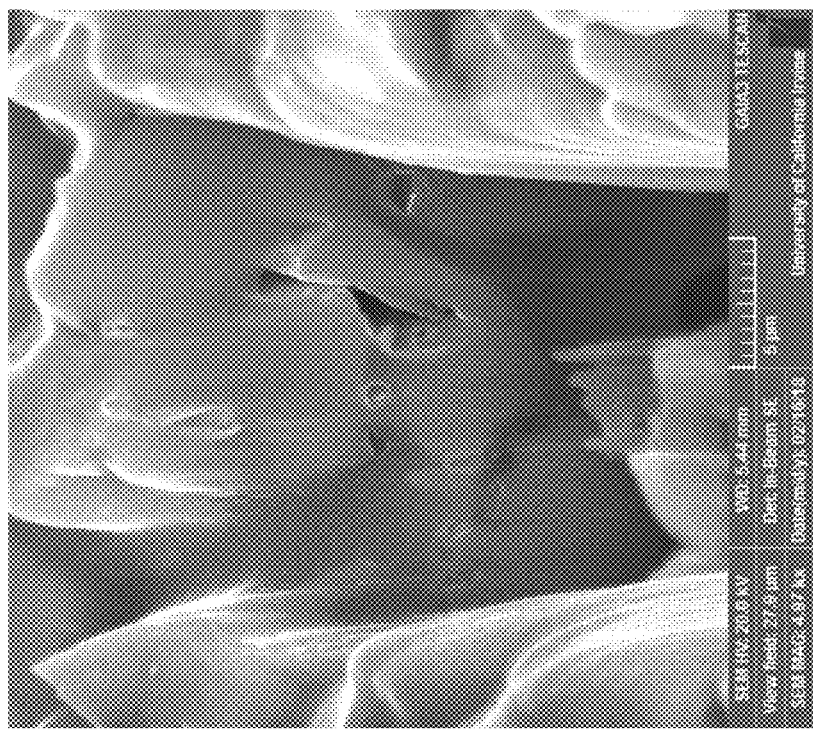
FIG. 30B is a SEM-FIB micrograph of a cross-section of an example silicon-carbon composite material made with silane-treated silicon particles.
Figure 30A:
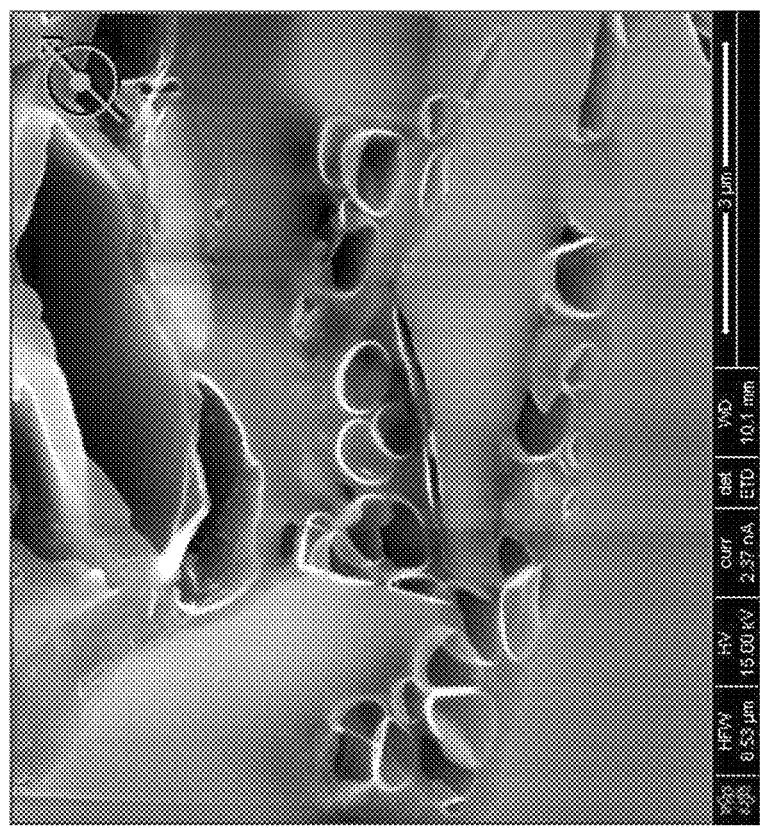
FIG. 30A is a scanning electron microscope with focused ion beam (SEM-FIB) micrograph of a cross-section of an example silicon-carbon composite material made with untreated silicon particles.

FIG. 30A is a scanning electron microscope with focused ion beam (SEM-FIB) micrograph of a cross-section of an example silicon-carbon composite material made with untreated silicon particles. FIG. 30B is a SEM-FIB micrograph of a cross-section of the example silicon-carbon composite material made with the silane-treated silicon particles. The composite material made with silane-treated silicon had fewer porosity in the silicon-carbon interfacial region compared with the composite material made with untreated silicon.

In another example, silicon was added to a 2.5% solution of N-(2-aminoethyl)-3-aminopropyltrimethoxysilane in N-methyl-2-pyrollidone and milled with zirconia media for 6 hours. The resulting slurry was combined with graphite and polyamic acid resin, and coated onto a PET substrate. Following the process described above, the film was converted into a silicon-carbon composite electrode.

The silicon-carbon composite electrodes were assembled into lithium-ion cells, containing cathodes, separator, and electrolyte solution. The cathodes were comprised of 15 µm aluminum foil coated with a 23 mg/cm$^2$, 3.02 g/cc film containing 95% NCM622, 2.5% conductive carbon additive, and 2.5% PVdF. The separator was a 16 µm porous polypropylene membrane, coated with 3.5 µm thick films consisting of a mixture of PVdF and PMMA. The electrolyte solution included 1.2M LiPF6 in organic carbonates. The cell design had a nominal capacity of 710 mAh. The cells were tested using constant current/constant voltage charge profiles and constant current discharge profiles. The upper voltage limit was 4.1V, and the lower voltage limit was 2.75V. The current was 1.42 A for the charge step, with a current limit of 0.035 A for the constant voltage portion, and a current of 0.35 A for the discharge step. Every 50 cycles, a characterization cycle was performed, with a charge current of 0.35 A and a discharge current of 0.14 A.

Figure 31:
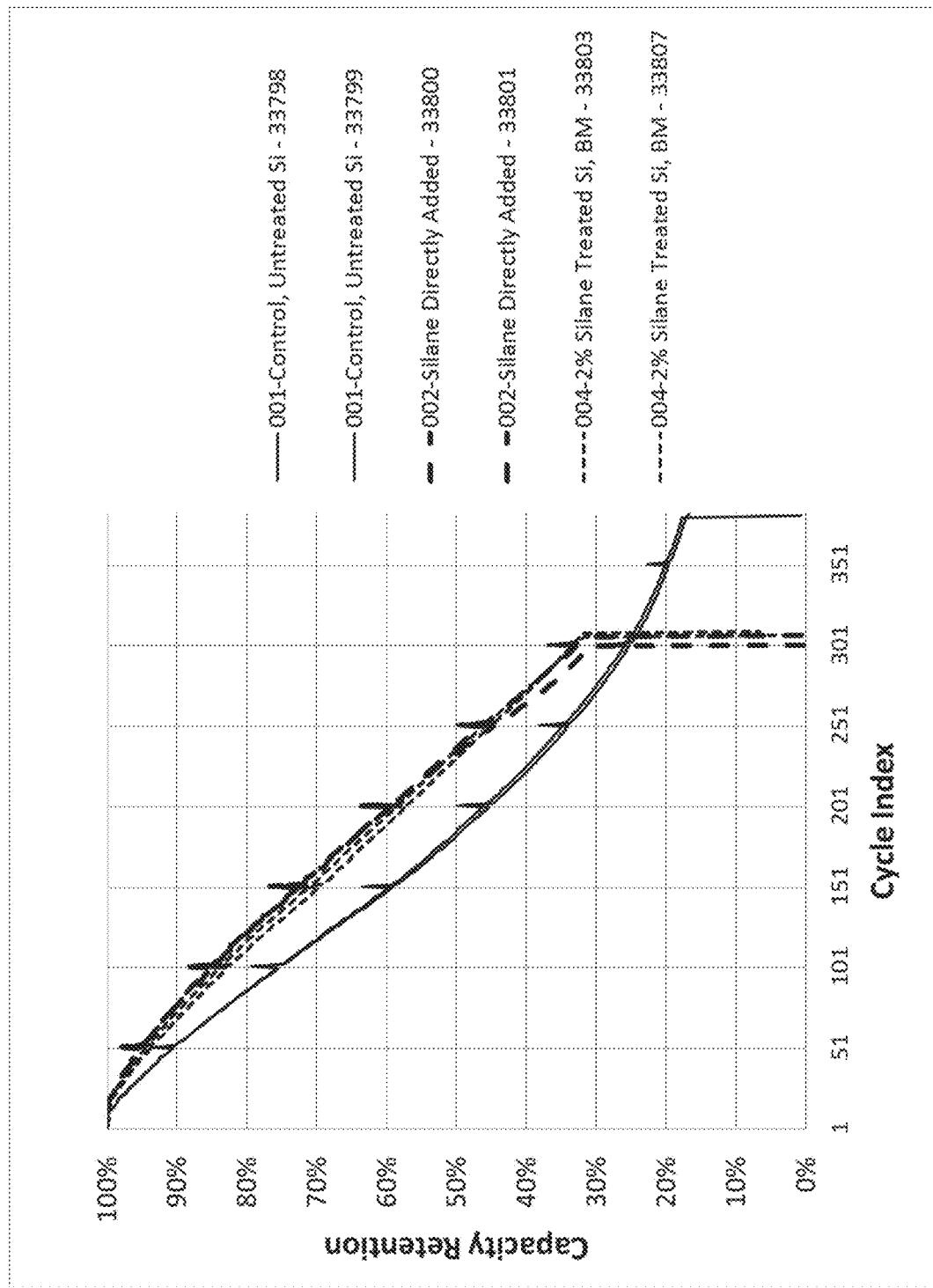
FIG. 31 shows a graph of capacity retention versus cycle number for full-cells comprising silane-treated silicon particles compared with full-cells comprising untreated silicon particles.

FIG. 31 shows a graph of capacity retention versus cycle number for full-cells comprising silane-treated silicon particles compared with full-cells comprising untreated silicon particles. The results for the full-cells fabricated with moisture-processed and rotovap-processed silane-treated silicon are shown as "Silane Treated Si." The results for the full-cells fabricated with the other silane treatment (e.g., adding organosilane into the slurry) are shown as "Silane Directly Added." The two different organosilane (N-(2-aminoethyl)-3-aminopropyltrimethoxysilane) treatment conditions provided improved capacity retention over untreated silicon, tested in full-cells vs NCM622, 4.1V to 2.75V.

Figure 32:
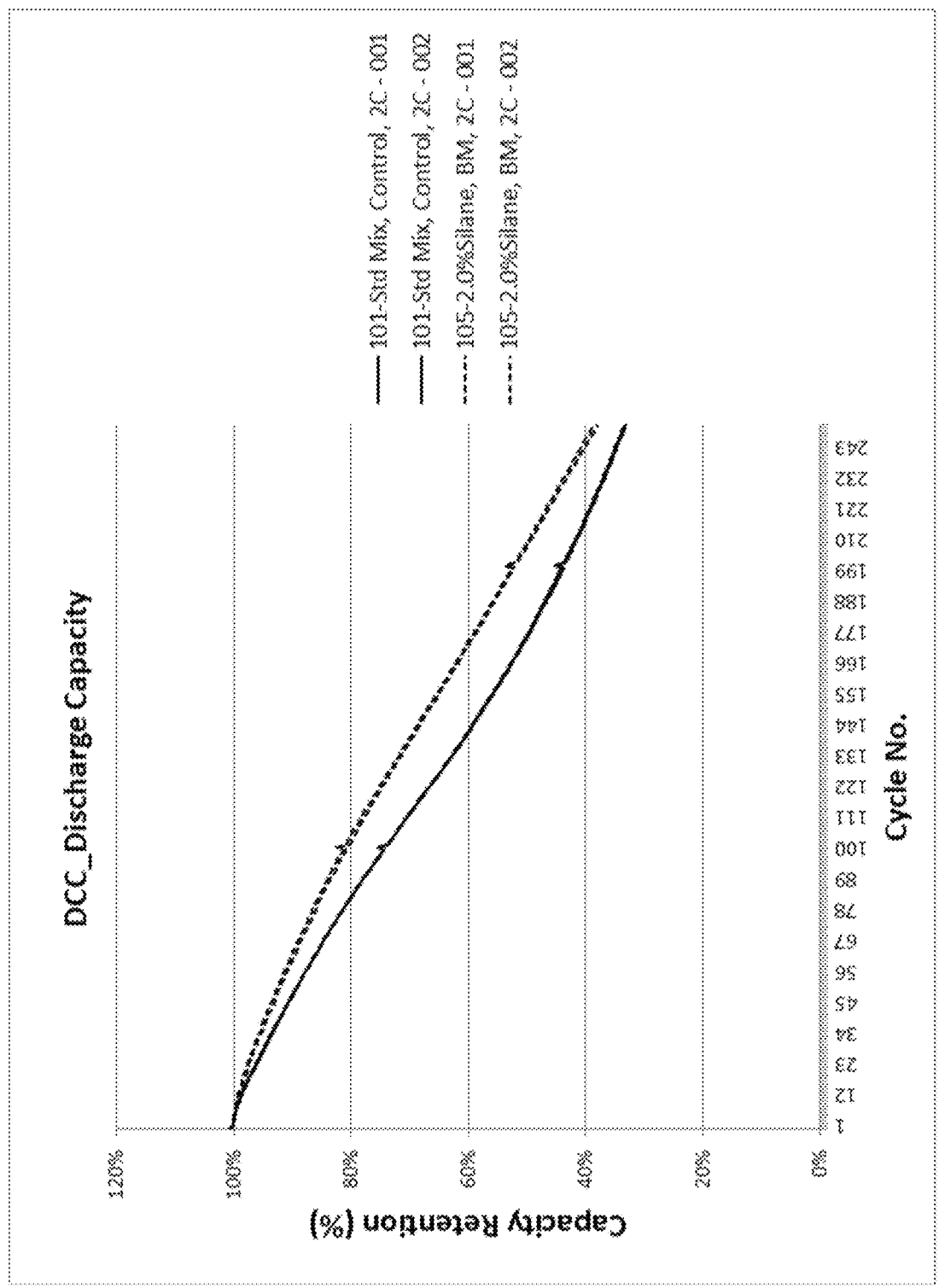
FIG. 32 shows a graph of capacity retention versus cycle number for full-cells comprising silane-treated silicon particles compared with full-cells comprising untreated silicon particles in a follow-up trial.

FIG. 32 shows a graph of capacity retention versus cycle number for full-cells comprising silane-treated silicon particles (using the method of adding organosilane into the slurry) compared with full-cells comprising untreated silicon particles in a follow-up trial. The results confirmed the performance improvement for organosilane-treated silicon under slightly modified test conditions (4.2V upper voltage cut-off instead of 4.1V, and with characterization cycles every 100 cycles).

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming a composite material film, the method comprising:
   providing a mixture comprising a precursor and silane-treated silicon particles; and
   pyrolysing the mixture to convert the precursor into one or more carbon phases to form the composite material film with the silicon particles distributed throughout the composite material film, wherein:

silane-treated silicon particles comprise silicon particles treated with one or more organosilanes;
the one or more organosilanes comprise one or more silanols, silyl ethers, silyl chlorides, dialkylaminosilanes, silyl hydrides, or cyclic azasilanes; and
the one or more organosilanes comprise dodecylsilane.

2. The method of claim 1, wherein the silane-treated silicon particles comprise silicon oxide surfaces reacted with the one or more organosilanes.

3. The method of claim 1, wherein the one or more organosilanes comprise one or more aminoalkyl functional groups.

4. The method of claim 3, wherein the one or more organosilanes comprise 3-aminopropyltriethoxysilane, N-(2-aminoethyl)-3-aminopropyltrimethoxysilane, or 2,2-dimethoxy-1,6-diaza-2-silacyclooctane.

5. The method of claim 3, wherein the precursor comprises polyimide.

6. The method of claim 1, wherein the one or more organosilanes comprise an epoxide linker.

7. The method of claim 6, wherein the epoxide linker comprises 5,6-epoxyhexyltriethoxysilane.

8. The method of claim 6, wherein the precursor comprises a phenolic resin.

9. The method of claim 1, wherein the one or more organosilanes comprise an aromatic functional group.

10. The method of claim 9, wherein the one or more organosilanes comprise benzyltriethoxysilane.

11. The method of claim 9, wherein the precursor comprises polycyclic aromatic hydrocarbon.

12. The method of claim 1, wherein the one or more organosilanes comprise (N,N-dimethylamino)trimethylsilane.

13. The method of claim 1, wherein the silicon particles are suspended in liquid comprising the one or more organosilanes.

14. The method of claim 1, wherein the silicon particles are exposed to one or more organosilane vapors.

15. The method of claim 1, wherein the mixture comprises the one or more organosilanes.

16. The method of claim 1, wherein the composite material film comprises the silicon particles at about 50% to about 99% by weight.

17. The method of claim 1, wherein the composite material film is electrochemically active.

18. The method of claim 1, wherein at least one of the one or more types of carbon phases is a continuous phase that holds the composite material film.

19. A method of forming a battery electrode, wherein the electrode comprises the composite material film of claim 1.

20. The method of claim 19, wherein the electrode is an anode.

21. A method of forming a composite material film, the method comprising:
providing a mixture comprising a precursor and silane-treated silicon particles; and
pyrolysing the mixture to convert the precursor into one or more carbon phases to form the composite material film with the silicon particles distributed throughout the composite material film, wherein:
silane-treated silicon particles comprise silicon particles treated with one or more organosilanes;
the one or more organosilanes comprise one or more silanols, silyl ethers, silyl chlorides, dialkylaminosilanes, silyl hydrides, or cyclic azasilanes; and
the one or more organosilanes comprise (N,N-dimethylamino)trimethylsilane.

22. The method of claim 21, wherein the silane-treated silicon particles comprise silicon oxide surfaces reacted with the one or more organosilanes.

23. The method of claim 21, wherein the one or more organosilanes comprise one or more aminoalkyl functional groups.

24. The method of claim 23, wherein the one or more organosilanes comprise 3-aminopropyltriethoxysilane, N-(2-aminoethyl)-3-aminopropyltrimethoxysilane, or 2,2-dimethoxy-1,6-diaza-2-silacyclooctane.

25. The method of claim 23, wherein the precursor comprises polyimide.

26. The method of claim 21, wherein the one or more organosilanes comprise an epoxide linker.

27. The method of claim 26, wherein the epoxide linker comprises 5,6-epoxyhexyltriethoxysilane.

28. The method of claim 21, wherein the precursor comprises a phenolic resin.

29. The method of claim 21, wherein the one or more organosilanes comprise an aromatic functional group.

30. The method of claim 29, wherein the one or more organosilanes comprise benzyltriethoxysilane.

31. The method of claim 21, wherein the precursor comprises polycyclic aromatic hydrocarbon.

32. The method of claim 21, wherein the silicon particles are suspended in liquid comprising the one or more organosilanes.

33. The method of claim 21, wherein the silicon particles are exposed to one or more organosilane vapors.

34. The method of claim 21, wherein the mixture comprises the one or more organosilanes.

35. The method of claim 21, wherein the composite material film comprises the silicon particles at about 50% to about 99% by weight.

36. The method of claim 21, wherein the composite material film is electrochemically active.

37. The method of claim 21, wherein at least one of the one or more types of carbon phases is a continuous phase that holds the composite material film.

38. A method of forming a battery electrode, wherein the electrode comprises the composite material film of claim 21.

39. The method of claim 38, wherein the electrode is an anode.

40. A method of forming a composite material film, the method comprising:
providing a mixture comprising a precursor and silane-treated silicon particles; and
pyrolysing the mixture to convert the precursor into one or more carbon phases to form the composite material film with the silicon particles distributed throughout the composite material film, wherein:
silane-treated silicon particles comprise silicon particles treated with one or more organosilanes; and
the silicon particles are exposed to one or more organosilane vapors.

41. The method of claim 40, wherein the silane-treated silicon particles comprise silicon oxide surfaces reacted with the one or more organosilanes.

42. The method of claim 40, wherein the one or more organosilanes comprise one or more silanols, silyl ethers, silyl chlorides, dialkylaminosilanes, silyl hydrides, or cyclic azasilanes.

43. The method of claim 42, wherein the one or more organosilanes comprise one or more aminoalkyl functional groups.

44. The method of claim 43, wherein the one or more organosilanes comprise 3-aminopropyltriethoxysilane, N-(2-aminoethyl)-3-aminopropyltrimethoxysilane, or 2,2-dimethoxy-1,6-diaza-2-silacyclooctane.

45. The method of claim 43, wherein the precursor comprises polyimide.

46. The method of claim 42, wherein the one or more organosilanes comprise an epoxide linker.

47. The method of claim 46, wherein the epoxide linker comprises 5,6-epoxyhexyltriethoxysilane.

48. The method of claim 46, wherein the precursor comprises a phenolic resin.

49. The method of claim 42, wherein the one or more organosilanes comprise an aromatic functional group.

50. The method of claim 49, wherein the one or more organosilanes comprise benzyltriethoxysilane.

51. The method of claim 49, wherein the precursor comprises polycyclic aromatic hydrocarbon.

52. The method of claim 40, wherein the silicon particles are suspended in liquid comprising the one or more organosilanes.

53. The method of claim 40, wherein the mixture comprises the one or more organosilanes.

54. The method of claim 40, wherein the composite material film comprises the silicon particles at about 50% to about 99% by weight.

55. The method of claim 40, wherein the composite material film is electrochemically active.

56. The method of claim 40, wherein at least one of the one or more types of carbon phases is a continuous phase that holds the composite material film.

57. A method of forming a battery electrode, wherein the electrode comprises the composite material film of claim 40.

58. The method of claim 57, wherein the electrode is an anode.

* * * * *